United States Patent
Chen et al.

(10) Patent No.: US 10,644,911 B1
(45) Date of Patent: May 5, 2020

(54) MULTI-LEVEL PULSE-AMPLITUDE MODULATION RECEIVER SYSTEM

(71) Applicant: NATIONAL CHIAO TUNG UNIVERSITY, Hsinchu (TW)

(72) Inventors: Wei-Zen Chen, Hsinchu (TW);
Chia-Tse Hung, Keelung (TW);
Yu-Ping Huang, Hsinchu (TW);
Yao-Chia Liu, Chiayi (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 16/547,958

(22) Filed: Aug. 22, 2019

(30) Foreign Application Priority Data

Dec. 19, 2018 (TW) .............................. 107145874 A

(51) Int. Cl.
| | |
|---|---|
| H04L 25/49 | (2006.01) |
| H04B 7/0417 | (2017.01) |
| H04L 27/38 | (2006.01) |
| H04B 7/005 | (2006.01) |
| H04B 17/336 | (2015.01) |
| H04L 27/04 | (2006.01) |

(52) U.S. Cl.
CPC ......... *H04L 25/4917* (2013.01); *H04B 7/005* (2013.01); *H04B 7/0417* (2013.01); *H04B 17/336* (2015.01); *H04L 27/04* (2013.01); *H04L 27/3863* (2013.01)

(58) Field of Classification Search
CPC . H04L 25/4917; H04L 27/04; H04L 27/3863; H04B 17/336; H04B 7/0417; H14B 7/005
See application file for complete search history.

(56) References Cited

U.S. PATENT DOCUMENTS

| | | |
|---|---|---|
| 8,576,903 B2 | 11/2013 | Raphaeli et al. |
| 8,804,809 B2 | 8/2014 | Raphaeli et al. |
| 2013/0101000 A1* | 4/2013 | Warke ............... H04L 25/03057 375/222 |

(Continued)

OTHER PUBLICATIONS

Pen-Jui Peng, et al. "A 56Gb/s PAM-4/NRZ Transceiver in 40nm CMOS." Proceedings of 2017 IEEE International Solid-State Circuits Conference (ISSCC) (Feb. 2017), pp. 110-112.

(Continued)

*Primary Examiner* — Jaison Joseph
(74) *Attorney, Agent, or Firm* — Rosenberg, Klein & Lee

(57) ABSTRACT

A multi-level pulse-amplitude modulation receiver system includes an analog equalizer, a digital equalizer, an automatic level tracking engine and an automatic gain controller. The analog equalizer and the automatic gain controller perform signal compensation on a multi-bit quasi-attenuation signal to generate a multi-level compensation signal. The digital equalizer receives the multi-level compensation signal, the positive threshold voltage and the negative threshold voltage, and thereby converts the multi-level compensation signal into a plurality of digital data. The automatic level tracking engine uses the digital data to generate a positive threshold voltage, a negative threshold voltage, at least two positive DC level voltages, and at least two negative DC level voltages, and the positive threshold voltage is an average of the two positive DC level voltages to avoid the nonlinear effect of the analog front end.

9 Claims, 7 Drawing Sheets

(56) References Cited

U.S. PATENT DOCUMENTS

2013/0243107 A1\* 9/2013 Chmelar ........... H04L 25/03057
375/259
2015/0195108 A1\* 7/2015 Prokop ............. H04L 25/03057
375/233

OTHER PUBLICATIONS

Liangxiao Tang, et al. "A 32Gb/s 133mW PAM-4 Transceiver with DFE Based on Adaptive Clock Phase and Threshold Voltage in 65nm CMOS." Proceedings of 2018 IEEE International Solid-State Circuits Conference (ISSCC) (Feb. 2018), pp. 114-116.
Chia-Tse Hung, et al. "A 40 Gb/s PAM-4 Receiver with 2-Tap DFE Based on Automatically Non-Even Level Tracking." Proceedings of 2018 IEEE Asian Solid-State Circuits Conference (A-SSCC) (Nov. 2018), pp. 213-214.

\* cited by examiner

MULTI-LEVEL PULSE-AMPLITUDE MODULATION RECEIVER SYSTEM

This application claims priority for Taiwan patent application no. 107145874 filed on Dec. 19, 2018, the content of which is incorporated by reference in its entirely.

BACKGROUND OF THE INVENTION

Field of the Invention

The present invention relates to a receiver system, particularly to a multi-level pulse-amplitude modulation receiver system.

Description of the Related Art

Nowadays, with the development of multimedia devices and cloud operations, the speed of serial transceiver systems increases massively. However, since non-return-to-zero (NRZ) data transceivers reach limitations of present processes, multi-level pulse-amplitude modulation scheme seems to be one of ways to breakthrough present bottlenecks. In recent conferences or journals, literatures on four pulse-amplitude modulation (PAM-4) have been proposed for times, and the trend of developing PAM-4 transceivers is unimaginably fast. Nevertheless, PAM-4 transceivers have challenges which NRZ transceivers never face. First, the analog front-end of the transceiver has to possess excellent linearity to avoid distortion and poor bit error rate. In addition, the digital equalizer in the transceiver is designed to eliminate multi-level inter-symbol interference. The digital equalizer requires a threshold voltage or compensation coefficients for demodulation, wherein the threshold voltage or the compensation coefficients change due to the characteristic of the channel Thus, an adaptive design is needed to automatically fit the properties of the channel. As a result, inventing an adaptive design used for the PAM-4 transceiver is a difficult and complicated problem. Besides, since the signal-to-noise ratio (SNR) required for PAM-4 data is higher than the SNR required for NRZ data, the automatic gain control is necessary. Input data is amplified as large as possible within the tolerable range for the linearity so that the receiver can achieve better performance.

Presently, the automatic level tracking circuit proposed in literatures to converge the threshold voltage and the ideal amplitude required for the adaptive design cannot tolerate the nonlinear effect of the analog front-end. In other words, adaptation is operated assuming the analog front-end is completely linear. However, the analog front-end is not perfectly linear. When the automatic level tracking circuit is influenced by the nonlinearity, the automatic level tracking circuit might generate a threshold voltage or a DC level that deviate from desired values. Owning to the deviation of the threshold voltage, the flash analog-to-digital converter (ADC) in the front-end cannot have the maximum voltage margin, thereby resulting in the misjudgment of a comparator. On the other hand, the adaptive design converges incorrect compensation coefficients because of improper DC level, whereby the multi-level inter-symbol interference is not completely eliminated.

On top of that, the adaptive designs proposed in the present literatures are based on PAM-4. The adaptive designs cannot be used for multi-level pulse-amplitude modulation in the future, such as 8-level pulse-amplitude modulation or 16-level pulse-amplitude modulation. The present adaptive designs cannot provide directions and solutions for transceivers in the future.

To overcome the abovementioned problems, the present invention provides a solution for multi-level pulse-amplitude modulation receiver system, so as to solve the aforementioned problems of the prior art.

SUMMARY OF THE INVENTION

The primary objective of the present invention is to provide a multi-level pulse-amplitude modulation receiver system, which uses a digital equalizer and an automatic level tracking engine to generate at least one threshold voltage and at least two DC level voltages, and converges them to desired values, so that the threshold voltage is an average of two DC level voltages, thereby eliminating multi-level inter-symbol interference and the nonlinear influences of the analog front-end. Thus, the digital equalizer has a maximum voltage margin and better bit error rate performance.

To achieve the abovementioned objectives, the present invention provides a multi-level pulse-amplitude modulation receiver system, which comprises an analog equalizer, electrically connected to a transmission channel, receiving a gain signal, the transmission channel receives a multi-level pulse-amplitude modulation signal and attenuates the multi-level pulse-amplitude modulation signal to output a multi-level attenuation signal to the analog equalizer, and the analog equalizer uses the gain signal to perform signal compensation on the multi-level attenuation signal to generate a multi-level compensation signal; a digital equalizer, electrically connected to the analog equalizer, receiving the multi-level compensation signal, at least one positive threshold voltage, at least one negative threshold voltage, a first clock signal, and a second clock signal, absolute values of the at least one positive threshold voltage and the at least one negative threshold voltage are equal, the second clock signal is an inverted the first clock signal, and the digital equalizer utilizes the at least one positive threshold voltage, the at least one negative threshold voltage, the first clock signal and the second clock signal to sequentially convert the multi-level compensation signal into a plurality of digital data, and number of the digital data is a positive integer multiple of four; an automatic level tracking engine, electrically connected to the digital equalizer, receiving the second clock signal and the digital data to generate the at least one positive threshold voltage, the at least one negative threshold voltage, at least two second positive DC level voltages and at least two negative DC level voltages, absolute values of the at least two positive DC level voltages are respectively equal to absolute values of the at least two negative DC level voltages, and the at least one positive threshold voltage is an average of the two positive DC level voltages; and an automatic gain controller, electrically connected to the automatic level tracking engine and the analog equalizer, receiving an expected voltage and one of the at least one negative threshold voltage and the at least two negative DC level voltages to generate the gain signal. For example, the digital equalizer is a decision feedback equalizer (DFE).

In an embodiment of the present invention, each of the digital data is a binary code, which is composed of at least three first digital values, and DFE further comprises: a first sampling and holding circuit, electrically connected to the analog equalizer, receiving the multi-level compensation signal and the first clock signal and using the first clock signal to sample the multi-level compensation signal, thereby generating a first multi-level sampling signal; a first adder, electrically connected to the first sampling and holding circuit, receiving and adding the first multi-level sampling signal, a first correction signal and a second correction signal to generate a first summing signal; at least one second adder, electrically connected to the first adder, receiving and adding the at least one negative threshold voltage and the first summing signal to generate at least one second summing signal; at least one third adder, electrically connected to the first adder, receiving and adding the at least one positive threshold voltage and the first summing signal to generate at least one third summing signal; at least three first latches, respectively electrically connected to the at least one second adder, the first adder and the at least one third adder, respectively receiving the at least one second summing signal, the first summing signal and the at least one third summing signal, receiving the second clock signal, and respectively comparing the at least one second summing signal, the first summing signal, and the at least one third summing signal with the second clock signal to respectively generate the at least three first digital values; at least three second latches, respectively electrically connected to the at least three first latches, respectively receiving the at least three first digital values, receiving the first clock signal, and respectively comparing the at least three first digital values with the first clock signal to respectively generate at least three second digital values; at least three third latches, respectively electrically connected to the at least three second latches, respectively receiving the at least three second digital values, receiving the second clock signal, and respectively comparing the at least three second digital values with the second clock signal to respectively generate at least three third digital values; a fourth adder, electrically connected the at least three second latches, receiving and adding the at least three second digital values to generate a fourth summing signal; a first multiplier, electrically connected to the first adder and the fourth adder, receiving the fourth summing signal and a second compensation coefficient, and multiplying the fourth summing signal by the second compensation coefficient to generate the first correction signal; a fifth adder, electrically connected to the at least three first latches, receiving and adding the at least three first digital values to generate a fifth summing signal; a second multiplier, electrically connected to the fifth adder, receiving the fifth summing signal and a first compensation coefficient and multiplying the fifth summing signal by the first compensation coefficient to generate a third correction signal; a second sampling and holding circuit, electrically connected to the analog equalizer, receiving the multi-level compensation signal and the second clock signal and using the second clock to sample the multi-level compensation signal, thereby generating a second multi-level sampling signal; a sixth adder, electrically connected to the second sampling and holding circuit and the second multiplier, receiving and adding the second multi-level sampling signal, the third correction signal, and a fourth correction signal to generate a sixth summing signal; at least one seventh adder, electrically connected to the sixth adder, receiving and adding the at least one positive threshold voltage and the sixth summing signal to generate at least one seventh summing signal; at least one eighth adder, electrically connected to the sixth adder, receiving and adding the at least one negative threshold voltage and the sixth summing signal to generate at least an eighth summing signal; at least three fourth latches, respectively electrically connected to the at least one seventh adder, the sixth adder and the at least one eighth adder, respectively receiving the at least one seventh summing signal, the sixth summing signal, and the at least one eighth summing signal, receiving the first clock signal, and respectively comparing the at least one seventh summing signal and the sixth summing signal, and the at least one eighth summing signal with the first clock signal to respectively generate at least three fourth digital values; at least three fifth latches, respectively electrically connected to the at least three fourth latches, respectively receiving the at least three fourth digital values, receiving the second clock signal, and respectively comparing the at least three fourth digital values with the second clock signal to respectively generate at least three fifth digital values; at least three sixth latches, respectively electrically connected to the at least three fifth latches, respectively receiving the at least three fifth digital values, receiving the first clock signal, and respectively comparing the at least three fifth digital values with the first clock signal to respectively generate at least three sixth digital values; a ninth adder, electrically connected to the at least three fourth latches, receiving and adding the at least three fourth digital values to generate a ninth summing signal; a third multiplier, electrically connected to the ninth adder and the first adder, receiving the ninth summing signal and the first compensation coefficient and multiplying the ninth summing signal by the first compensation coefficient to generate the second correction signal; a tenth adder, electrically connected to the at least three fifth latches, receiving and adding the at least three fifth digital values to generate a tenth summing signal; and a fourth multiplier, electrically connected to the tenth adder and the sixth adder, receiving the tenth summing signal and the second compensation coefficient, and multiplying the tenth summing signal by the second compensation coefficient to generate the fourth correction signal. In order to eliminate multi-level inter-symbol interference, the information transmitted back by the DFE has to include polarity information and height information.

In an embodiment of the present invention, the at least two positive DC level voltages comprise a first positive DC level voltage and a second positive DC level voltage, the at least two negative DC level voltages comprise a first negative DC level voltage and a second negative DC level voltage, absolute values of the first positive DC level voltage and the second positive DC level voltage are respectively equal to absolute values of the first negative DC level voltage and the second negative DC level voltage, and the automatic level tracking engine further comprises: a fifth multiplier, electrically connected to the first adder, receiving the first summing signal and multiplying it by negative one to generate a negative summing signal; a first pattern filter, electrically connected to the at least three first latches, receiving the at least three first digital values, the first pattern filter uniformly divides all the binary codes into a first group and a second group, the binary codes of the first group are greater than the binary codes of the second group, the first pattern filter sequentially pairs the binary codes of the first group from high to low with the binary codes of the second group from low to high, uses two paired the binary codes to correspond to a first value or a second value, and outputs the first value or the second value; an eleventh adder, electrically connected to the fifth multiplier, receiving and adding the negative summing signal and the first positive DC level voltage to generate an eleventh summing signal; a seventh latch, electrically connected to the eleventh adder, receiving and comparing the second clock signal and the eleventh summing signal to generate a seventh digital value; a first inverter, electrically connected to the seventh latch, receiving and inverting the seventh digital value to generate a first inverted digital value; a twelfth adder, electrically connected to the fifth multiplier, receiving and adding the negative summing signal and the first negative DC level voltage to generate a twelfth summing signal; an eighth latch, electrically connected to the twelfth adder, receiving and comparing the second clock signal and the twelfth summing signal to generate an eighth digital value; a first multiplexer, electrically connected to the first inverter, the eighth latch, and the first latch corresponding to the first summing signal, receiving the first inverted digital value, the eighth digital value, and the first digital value corresponding to the first summing signal, thereby outputting a first output value, the first multiplexer selects the first inverted digital value as the first output value when the first digital value corresponding to the first summing signal is 1, and the first multiplexer selects the eighth digital value as the first output value when the first digital value corresponding to the first summing signal is 0; a first signal selector, electrically connecting the first multiplexer and the first pattern filter, receiving the first value and the first output value, when the first pattern filter outputs the first value, the first signal selector outputs the first output value, and when the first pattern filter outputs the second value, the first signal selector outputs 0; a first integrator, electrically connected to the first signal selector and the eleventh adder, receiving and integrating the first output value to generate the first positive DC level voltage; a sixth multiplier, electrically connected to the first integrator and the twelfth adder, receiving the first positive DC level voltage and multiplying it by negative one to generate the first negative DC level voltage; a thirteenth adder, electrically connected to the fifth multiplier, receiving and adding the negative summing signal and the second positive DC level voltage to generate a thirteenth summing signal; a ninth latch, electrically connected to the thirteenth adder, receiving and comparing the second clock signal and the thirteenth summing signal to generate a ninth digital value; a second inverter, electrically connected to the ninth latch, receiving and inverting the ninth digital value to generate a second inverted digital value; a fourteenth adder, electrically connected to the fifth multiplier, receiving and adding the negative summing signal and the second negative DC level voltage to generate a fourteenth summing signal; a tenth latch, electrically connected to the fourteenth adder, receiving and comparing the second clock signal and the fourteenth summing signal to generate an tenth digital value; a second multiplexer, electrically connected to the second inverter, the tenth latch, and the first latch corresponding to the first summing signal, receiving the second inverted digital value, the tenth digital value, and the first digital value corresponding to the first summing signal, thereby outputting a second output value, the second multiplexer selects the second inverted digital value as the second output value when the first digital value corresponding to the first summing signal is 1, and the second multiplexer selects the tenth digital value as the second output value when the first digital value corresponding to the first summing signal is 0; a second signal selector, electrically connected to the second multiplexer and the first pattern filter, receiving the second value and the second output value, when the first pattern filter outputs the second value, the second signal selector outputs the second output value, and when the first pattern filter outputs the first value, the second signal selector outputs 0; a second integrator, electrically connected to the second signal selector and the thirteenth adder, receiving and integrating the second output value to generate the second positive DC level voltage; a seventh multiplier, electrically connected to the second integrator and the fourteenth adder, receiving the second positive DC level voltage and multiplying it by negative one to generate the second negative DC level voltage; a fifteenth adder, electrically connected to the fifth multiplier, receiving and adding the negative summing signal and the at least one positive threshold voltage to generate a fifteenth summing signal; an eleventh latch, electrically connected to the fifteenth adder, receiving and comparing the second clock signal and the fifteenth summing signal to generate an eleventh digital value; a third inverter, electrically connected to the eleventh latch, receiving and inverting the eleventh digital value to generate a third inverted digital value; a sixteenth adder, electrically connected to the fifth multiplier, receiving and adding the negative summing signal and the at least one negative threshold voltage to generate a sixteenth summing signal; a twelfth latch, electrically connected to the sixteenth adder, receiving and comparing the second clock signal and the sixteenth summing signal to generate an twelfth digital value; a third multiplexer, electrically connected to the third inverter, the twelfth latch, and the first latch corresponding to the first summing signal, receiving the third inverted digital value, the twelfth digital value, and the first digital value corresponding to the first summing signal, thereby outputting a third output value, the third multiplexer selects the third inverted digital value as the third output value when the first digital value corresponding to the first summing signal is 1, and the third multiplexer selects the twelfth digital value as the third output value when the first digital value corresponding to the first summing signal is 0; a third integrator, electrically connected to the third multiplexer, the fifteenth adder, the at least one third adder, and the at least one seventh adder, receiving and integrating the third output value to generate the at least one positive threshold voltage; and an eighth multiplier, electrically connected to the third integrator, the at least one second adder, and the at least one eighth adder, receiving the at least one positive threshold voltage and multiplying it by negative one to generate the at least one negative threshold voltage. The first signal selector cooperates with the first pattern filter, such that the data for the second positive DC level voltage cannot be transmitted to the first integrator. The second signal selector cooperates with the first pattern filter, such that the data for the first positive DC level voltage cannot be transmitted to the second integrator.

In an embodiment of the present invention, the multi-level pulse-amplitude modulation receiver system further comprises a least mean square (LMS) engine. The LMS engine further comprises: a ninth multiplier, electrically connected to the first adder, receiving the first summing signal and multiplying it by negative one to generate the negative summing signal; a second pattern filter, electrically connected to the at least three first latches, receiving the at least three first digital values, the second pattern filter uniformly divides all the binary codes into a third group and a fourth group, the binary codes of the third group are greater than the binary codes of the fourth group, the second pattern filter sequentially pairs the binary codes of the third group from high to low with the binary codes of the fourth group from low to high, uses two paired the binary codes to correspond to a third value or a fourth value, and outputs the third value or the fourth value; a seventeenth adder, electrically connected to the ninth multiplier and the first integrator, receiving and adding the negative summing signal and the first positive DC level voltage to generate a seventeenth summing signal; a thirteenth latch, electrically connected to the seventeenth adder, receiving and comparing the second clock signal and the seventeenth summing signal to generate a thirteenth digital value; an eighteenth adder, electrically connected to the ninth multiplier and the sixth multiplier, receiving and adding the negative summing signal and the first negative DC level voltage to generate an eighteenth summing signal; a fourteenth latch, electrically connected to the eighteenth adder, receiving and comparing the second clock signal and the eighteenth summing signal to generate a fourteenth digital value; a fourth multiplexer, electrically connected to the thirteenth latch, the fourteenth latch, and the first latch corresponding to the first summing signal, receiving the thirteenth digital value, the fourteenth digital value, and the first digital value corresponding to the first summing signal, thereby outputting a fourth output value, the fourth multiplexer selects the thirteenth digital value as the fourth output value when the first digital value corresponding to the first summing signal is 1, and the fourth multiplexer selects the fourteenth digital value as the fourth output value when the first digital value corresponding to the first summing signal is 0; a nineteenth adder, electrically connected to the ninth multiplier and the second integrator, receiving and adding the negative summing signal and the second positive DC level voltage to generate a nineteenth summing signal; a fifteenth latch, electrically connected to the nineteenth adder, receiving and comparing the second clock signal and the nineteenth summing signal to generate a fifteenth digital value; a twentieth adder, electrically connected to the ninth multiplier and the seventh multiplier, receiving and adding the negative summing signal and the second negative DC level voltage to generate a twentieth summing signal; a sixteenth latch, electrically connected to the twentieth adder, receiving and comparing the second clock signal and the twentieth summing signal to generate a sixteenth digital value; a fifth multiplexer, electrically connected to the fifteenth latch, the sixteenth latch, and the first latch corresponding to the first summing signal, receiving the fifteenth digital value, the sixteenth digital value, and the first digital value corresponding to the first summing signal, thereby outputting a fifth output value, the fifth multiplexer selects the fifteenth digital value as the fifth output value when the first digital value corresponding to the first summing signal is 1, and the fifth multiplexer selects the sixteenth digital value as the fifth output value when the first digital value corresponding to the first summing signal is 0; a sixth multiplexer, electrically connected to the fourth multiplexer, the fifth multiplexer, and the second pattern filter, receiving either of the third value or the fourth value, the fourth output value, and the fifth output value, thereby outputting a sixth output value, the sixth multiplexer selects the fourth value as the sixth output value when the second pattern filter outputs the third value, and the sixth multiplexer selects the fifth value as the sixth output value when the second pattern filter outputs the fourth value; a tenth multiplier, electrically connected to the sixth multiplexer and the fifth latch corresponding to the fifth summing signal, receiving the sixth output value and the fifth digital value corresponding to the sixth summing signal, and multiplying the sixth output value by the fifth digital value corresponding to the sixth summing signal to generate a first compensation signal; a fourth integrator, electrically connected to the tenth multiplier, the first multiplier, and the fourth multiplier, receiving the first compensation signal and integrating it to generate the first compensation coefficient; an eleventh multiplier, electrically connected to the sixth multiplexer and the third latch corresponding to the first summing signal, receiving the sixth output value and the third digital value corresponding to the first summing signal, and multiplying the sixth output value by the third digital value corresponding to the first summing signal to generate a second compensation signal; and a fifth integrator, electrically connected to the eleventh multiplier, the second multiplier, and the third multiplier, receiving the second compensation signal and integrating it to generate the second compensation coefficient. The LMS engine and the automatic level tracking engine share much hardware, and thus the automatic level tracking engine is easily combined with the LMS engine, whereby the automatic level tracking engine has the competitiveness.

In an embodiment of the present invention, the automatic gain controller further comprises: a twenty-first adder, electrically connected to the sixth multiplier, the seventh multiplier, or the eighth multiplier, receiving and adding the expected voltage and one of the first negative DC level voltage, the second negative DC level voltage, and the at least one negative threshold voltage to generate a gain voltage; a seventeenth latch, electrically connected to the twenty-first adder, receiving and comparing the gain voltage and a third clock signal whose frequency is more than 10 times slower than a frequency of the first clock signal to generate a seventeenth digital value; and a sixth integrator, electrically connected to the seventeenth latch and the analog equalizer, receiving and integrating the seventeenth digital value to generate the gain signal. The automatic level tracking engine provides the LMS engine with the first positive DC level voltage, the first negative DC level voltage, the second positive DC level voltage, and the second negative DC level voltage, which have the low-frequency energy information of the analog data. Thus, the automatic level tracking engine is combined with the automatic gain controller, let the amplitude of the multi-level attenuation signal be higher than the minimum amplitude tolerated by the receiver system.

In an embodiment of the present invention, the at least two positive DC level voltages comprise a first positive DC level voltage and a second positive DC level voltage, the at least two negative DC level voltages comprise a first negative DC level voltage and a second negative DC level voltage, absolute values of the first positive DC level voltage and the second positive DC level voltage are respectively equal to absolute values of the first negative DC level voltage and the second negative DC level voltage, and the automatic level tracking engine further comprises: a fifth multiplier, electrically connected to the first adder, receiving the first summing signal and multiplying it by negative one to generate a negative summing signal; a first pattern filter, electrically connected to the at least three first latches, receiving the at least three first digital values, the first pattern filter uniformly divides all the binary codes into a first group and a second group, the binary codes of the first group are greater than the binary codes of the second group, the first pattern filter sequentially pairs the binary codes of the first group from high to low with the binary codes of the second group from low to high, uses two paired the binary codes to correspond to a first value or a second value, and outputs the first value or the second value; an eleventh adder, electrically connected to the fifth multiplier, receiving and adding the negative summing signal and the first positive DC level voltage to generate an eleventh summing signal; a seventh latch, electrically connected to the eleventh adder, receiving and comparing the second clock signal and the eleventh summing signal to generate a seventh digital value; a first inverter, electrically connected to the seventh latch, receiving and inverting the seventh digital value to generate a first inverted digital value; a twelfth adder, electrically connected to the fifth multiplier, receiving and adding the negative summing signal and the first negative DC level voltage to generate a twelfth summing signal; an eighth latch, electrically connected to the twelfth adder, receiving and comparing the second clock signal and the twelfth summing signal to generate an eighth digital value; a first multiplexer, electrically connected to the first inverter, the eighth latch, and the first latch corresponding to the first summing signal, receiving the first inverted digital value, the eighth digital value, and the first digital value corresponding to the first summing signal, thereby outputting a first output value, the first multiplexer selects the first inverted digital value as the first output value when the first digital value corresponding to the first summing signal is 1, and the first multiplexer selects the eighth digital value as the first output value when the first digital value corresponding to the first summing signal is 0; a first signal selector, electrically connecting the first multiplexer and the first pattern filter, receiving the first value and the first output value, when the first pattern filter outputs the first value, the first signal selector outputs the first output value, and when the first pattern filter outputs the second value, the first signal selector outputs 0; a first integrator, electrically connected to the first signal selector and the eleventh adder, receiving and integrating the first output value to generate the first positive DC level voltage; a sixth multiplier, electrically connected to the first integrator and the twelfth adder, receiving the first positive DC level voltage and multiplying it by negative one to generate the first negative DC level voltage; a thirteenth adder, electrically connected to the fifth multiplier, receiving and adding the negative summing signal and the second positive DC level voltage to generate a thirteenth summing signal; a ninth latch, electrically connected to the thirteenth adder, receiving and comparing the second clock signal and the thirteenth summing signal to generate a ninth digital value; a second inverter, electrically connected to the ninth latch, receiving and inverting the ninth digital value to generate a second inverted digital value; a fourteenth adder, electrically connected to the fifth multiplier, receiving and adding the negative summing signal and the second negative DC level voltage to generate a fourteenth summing signal; an tenth latch, electrically connected to the fourteenth adder, receiving and comparing the second clock signal and the fourteenth summing signal to generate an tenth digital value; a second multiplexer, electrically connected to the second inverter, the tenth latch, and the first latch corresponding to the first summing signal, receiving the second inverted digital value, the tenth digital value, and the first digital value corresponding to the first summing signal, thereby outputting a second output value, the second multiplexer selects the second inverted digital value as the second output value when the first digital value corresponding to the first summing signal is 1, and the second multiplexer selects the tenth digital value as the second output value when the first digital value corresponding to the first summing signal is 0; a second signal selector, electrically connecting the second multiplexer and the first pattern filter, receiving the second value and the second output value, when the first pattern filter outputs the second value, the second signal selector outputs the second output value, and when the first pattern filter outputs the first value, the second signal selector outputs 0; a second integrator, electrically connected to the second signal selector and the thirteenth adder, receiving and integrating the second output value to generate the second positive DC level voltage; a seventh multiplier, electrically connected to the second integrator and the fourteenth adder, receiving the second positive DC level voltage and multiplying it by negative one to generate the second negative DC level voltage; a fifteenth adder, electrically connected to the first integrator and the second integrator, receiving and adding the first positive DC level voltage and the second positive DC level voltage to generate a fifteenth summing signal; a divider, electrically connected to the fifteenth adder, the at least one third adder, and the at least one seventh adder, receiving the fifteenth summing signal and dividing it by two to generate the at least one positive threshold voltage; and an eighth multiplier, electrically connected to the divider, the at least one second adder, and the at least one eighth adder, receiving the at least one positive threshold voltage and multiplying it by negative one to generate the at least one negative threshold voltage. The automatic level tracking engine lacks more hardware to consume fewer energy.

Below, the embodiments are described in detail in cooperation with the drawings to make easily understood the technical contents, characteristics and accomplishments of the present invention.

DETAILED DESCRIPTION OF THE INVENTION

Figure 1:
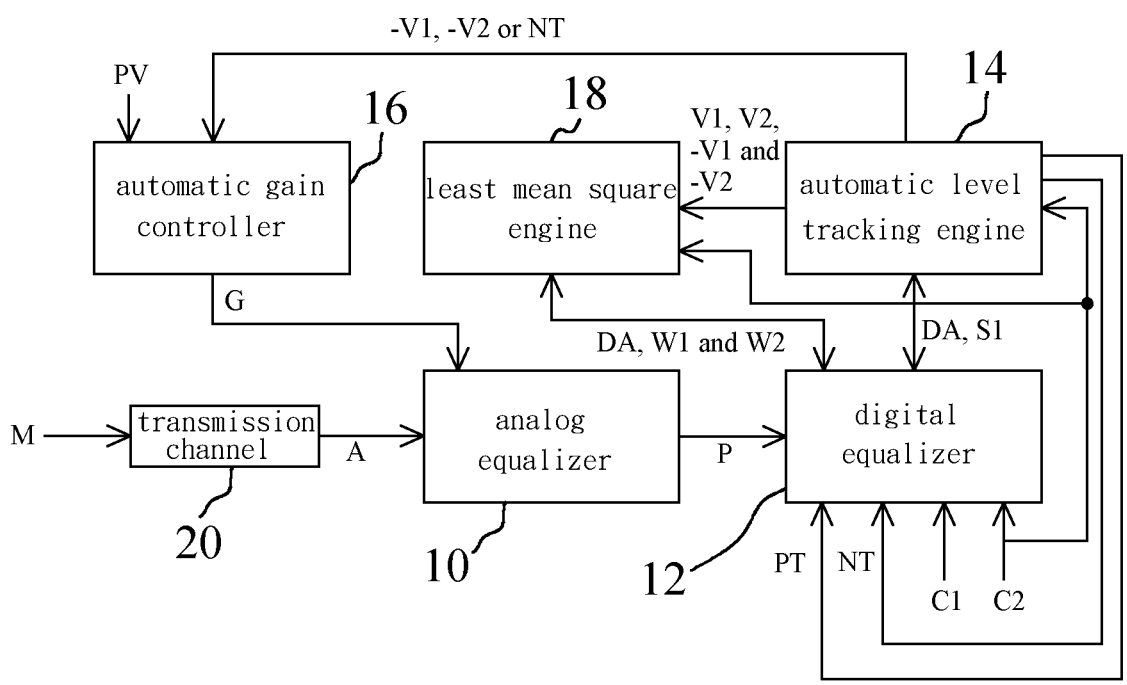
FIG. 1 is a diagram schematically showing a multi-level pulse-amplitude modulation receiving system according to an embodiment of the present invention.

The present invention provides a multi-level pulse-amplitude modulation receiving system. Presently, receivers and protocols mostly transmit non-return-to-zero (NRZ) data. However, with the increase of transmission speed and channel length, the channel attenuation becomes more and more serious and has already reached limitations of NRZ data transceivers. How to effectively increase the transmission rate of a serial transmission receiver system under the reasonable circuit design difficulty is a very important issue. Multi-level pulse-amplitude modulation is considered as one of ways to break through the limitation. Multi-level pulse-amplitude modulation uses different DC level voltages to represent more than one bit of data within one symbol time. For example, four pulse-amplitude modulation (PAM-4) may have four DC level voltages in one symbol time, and eight pulse-amplitude modulations may have eight DC level voltages in one symbol time.

In order to compensate the data attenuated by the channel, the receiver system has to possess a complete equalization function. Since the signal-to-noise ratio require for multi-level pulse-amplitude modulation is higher than the signal-to-noise ratio require for NRZ data. If an analog equalizer is excessively used, the amplification of high-frequency noise will influence the performance of the receiver. Thus, a digital equalizer such as a decision feedback equalizer (DFE) is necessary. The receiver system itself has to determine properties of a channel without predicting a channel model. As a result, the adaptive design is indispensable. Besides, the receiver system requires multiple stable threshold voltages among DC level voltages to complete multi-level pulse amplitude demodulation. Thus, an automatic level tracking engine is also integrated within the receiver system.

The present invention provides an automatic level tracking engine to generate a threshold voltage required for demodulation and ideal DC level voltages used for channel compensation. The idea can be applied to multi-level pulse-amplitude modulation and verified by four-level pulse-amplitude modulation, which is helpful in developing wired transmission. Even the analog front end of the receiver system has nonlinear properties, the DC level voltages found by the engine are not shifted due to nonlinearity but located at expected ideal positions to complete non-even level detection. Besides, the designer can use the DC level voltage converged by the automatic level tracking engine to finish the automatic gain control of the receiver system, such that data amplitude varies within the acceptable sensitivity of the receiver system.

Refer to FIG. 1, FIG. 2, FIG. 3, FIG. 4, and FIG. 5. The multi-level pulse-amplitude modulation receiver system of the present invention is introduced as follows. The multi-level pulse-amplitude modulation receiver system comprises an analog equalizer 10, a digital equalizer 12, an automatic level tracking engine 14, an automatic gain controller 16, and a least mean square (LMS) engine 18. In the embodiment, the analog equalizer 10 is a continuous time linear equalizer (CTLE), and the digital equalizer 12 is a decision feedback equalizer (DFE). The analog equalizer 10, electrically connected to a transmission channel 20, receives a gain signal G The transmission channel 20 receives a multi-level pulse-amplitude modulation signal M and attenuates it to output a multi-level attenuation signal A to the analog equalizer 10. The analog equalizer 10 uses the gain signal G to perform signal compensation on the multi-level attenuation signal A to generate a multi-level compensation signal P. In the embodiment, the multi-level pulse-amplitude modulation signal M is a four-level pulse-amplitude modulation signal. The digital equalizer 12, electrically connected to the analog equalizer 10, receives the multi-level compensation signal M, at least one positive threshold voltage PT, at least one negative threshold voltage NT, a first clock signal C1, and a second clock signal C2. The absolute values of the at least one positive threshold voltage PT and the at least one negative threshold voltage NT are equal. The second clock signal C2 is the inverted first clock signal C1. The digital equalizer 12 utilizes the at least one positive threshold voltage PT, the at least one negative threshold voltage NT, the first clock signal C1 and the second clock signal C2 to sequentially convert the multi-level compensation signal P into a plurality of digital data DA. The number of the digital data DA is a positive integer multiple of four. The automatic level tracking engine 14, electrically connected to the digital equalizer 12, receives the second clock signal C2 and all the digital data DA to generate the at least one positive threshold voltage PT, the at least one negative threshold voltage NT, at least two second positive DC level voltages and at least two negative DC level voltages. The absolute values of the at least two positive DC level voltages are respectively equal to the absolute values of the at least two negative DC level voltages. The at least one positive threshold voltage is an average of the two positive DC level voltages. The automatic gain controller 16, electrically connected to the automatic level tracking engine 14 and the analog equalizer 10, receives an expected voltage PV and one of the at least one negative threshold voltage NT and the at least two negative DC level voltages to generate the gain signal G.

The four-level pulse-amplitude modulation signal modulates two bits into four analog signals with different voltage levels, which represents that the input of the receiver system has an opportunity to have two input signals with the same polarities and different amplitudes. From the analysis, it is known that the two pluses with different amplitudes cause inter-symbol interferences that are directly proportional to the heights of the pluses. As a result, in order to eliminate multi-level inter-symbol interference, the information transmitted back by the decision feedback equalizer includes polarity information and height information. Each of digital data DA has a binary code with at least three bits, wherein the binary code is composed of at least three digital values D1. In the embodiment, all the digital data DA from low to high may include 000, 001, 011, and 111. The decision feedback equalizer further comprises a first sampling and holding circuit 22, a first adder 24, at least one second adder 26, at least one third adder 28, at least three first latches 30, at least three second latches 32, at least three third latches 34, a fourth adder 36, a first multiplier 38, a fifth adder 40, a second multiplier 42, a second sampling and holding circuit 44, a sixth adder 46, at least one seventh adder 48, at least one eighth adder 50, at least three fourth latches 52, at least three fifth latches 54, at least three sixth latches 56, a ninth adder 58, a third multiplier 60, a tenth adder 62, and a fourth multiplier 64. In the embodiment, the number of the first digital values D1, the first latches 30, the second latches 32, the third latches 34, the fourth latches 52, the fifth latches 54, or the sixth latches 56 is three, and the number of the second adder 26, the third adder 28, the seventh adder 48, or the eighth adder 50 is one.

The first sampling and holding circuit 22, electrically connected to the analog equalizer 10, receives the multi-level compensation signal P and the first clock signal C1 and uses the first clock signal C1 to sample the multi-level compensation signal P, thereby generating a first multi-level sampling signal SA1. The first adder 24, electrically connected to the first sampling and holding circuit 22, receives and adds the first multi-level sampling signal SA1, a first correction signal R1 and a second correction signal R2 to generate a first summing signal S1. The second adder 26, electrically connected to the first adder 24, receives and adds the negative threshold voltage NT and the first summing signal S1 to generate at least one second summing signal S2. In the embodiment, the number of the second summing signal S2 is one. The third adder 28, electrically connected to the first adder 24, receives and adds the positive threshold voltage PT and the first summing signal S1 to generate at least one third summing signal S3. In the embodiment, the number of the third summing signal S3 is one. The three first latches 30, respectively electrically connected to the second adder 26, the first adder 24 and the third adder 28, respectively receive the second summing signal S2, the first summing signal S1 and the third summing signal S3. The three first latches 30 receive the second clock signal C2 and respectively compare the second summing signal S2, the first summing signal S1, and the third summing signal S3 with the second clock signal C2 to respectively generate the three first digital values D1. The three second latches 32, respectively electrically connected to the three first latches 30, respectively receive the three first digital values D1. The three second latches 32 receive the first clock signal C1 and respectively compare the three first digital values D1 with the first clock signal C1 to respectively generate at least three second digital values D2. In the embodiment, the number of the second digital values D2 is three. The three third latches 34, respectively electrically connected to the three second latches 32, respectively receive the three second digital values D2. The three third latches 34 receive the second clock signal C2 and respectively compare the three second digital values D2 with the second clock signal C2 to respectively generate at least three third digital values D3. In the embodiment, the number of the third digital values D3 is three. The fourth adder 36, electrically connected the three second latches 32, receives and adds the three second digital values D2 to generate a fourth summing signal S4. The first multiplier 38, electrically connected to the first adder 24 and the fourth adder 36, receives the fourth summing signal S4 and a second compensation coefficient W2, and multiplies the fourth summing signal S4 by the second compensation coefficient W2 to generate the first correction signal R1. The fifth adder 40, electrically connected to the three first latches 30, receives and adds the three first digital values D1 to generate a fifth summing signal S5. The second multiplier 42, electrically connected to the fifth adder 40, receives the fifth summing signal S5 and a first compensation coefficient W1 and multiplies the fifth summing signal S5 by the first compensation coefficient W1 to generate a third correction signal R3.

The second sampling and holding circuit 44, electrically connected to the analog equalizer 10, receives the multi-level compensation signal P and the second clock signal C2 and uses the second clock C2 to sample the multi-level compensation signal P, thereby generating a second multi-level sampling signal SA2. The sixth adder 46, electrically connected to the second sampling and holding circuit 44 and the second multiplier 42, receives and adds the second multi-level sampling signal SA2, the third correction signal R3, and a fourth correction signal R4 to generate a sixth summing signal S6. The seventh adder 48, electrically connected to the sixth adder 46, receives and adds the positive threshold voltage PT and the sixth summing signal S6 to generate at least one seventh summing signal S7. In the embodiment, the number of the seventh summing signal S7 is one. The eighth adder 50, electrically connected to the sixth adder 46, receives and adds the negative threshold voltage NT and the sixth summing signal S6 to generate at least an eighth summing signal S8. In the embodiment, the number of the eighth summing signal S8 is one. The three fourth latches 52, respectively electrically connected to the seventh adder 48, the sixth adder 46 and the eighth adder 50, respectively receive the seventh summing signal S7, the sixth summing signal S6, and the eighth summing signal S8. The three fourth latches 52 receive the first clock signal C1 and respectively compare the seventh summing signal S7 and the sixth summing signal S6, and the eighth summing signal S8 with the first clock signal C1 to respectively generate at least three fourth digital values D4. In the embodiment, the number of the fourth digital values D4 is three. The three fifth latches 54, respectively electrically connected to the three fourth latches 52, respectively receive the three fourth digital values D4. The three fifth latches 54 receive the second clock signal C2 and respectively compare the three fourth digital values D4 with the second clock signal C2 to respectively generate at least three fifth digital values D5. In the embodiment, the number of the fifth digital values D5 is three. The three sixth latches 56, respectively electrically connected to the three fifth latches 54, respectively receive the three fifth digital values D5. The three sixth latches 56 receive the first clock signal C1 and respectively compare the three fifth digital values D5 with the first clock signal C1 to respectively generate at least three sixth digital values D6. In the embodiment, the number of the sixth digital values D6 is three. The ninth adder 58, electrically connected to the three fourth latches 52, receives and adds the three fourth digital values D4 to generate a ninth summing signal S9. The third multiplier 60, electrically connected to the ninth adder 58 and the first adder 24, receives the ninth summing signal S9 and the first compensation coefficient W1 and multiplying the ninth summing signal by the first compensation coefficient W1 to generate the second correction signal R2. The tenth adder 62, electrically connected to the three fifth latches 54, receives and adds the three fifth digital values D5 to generate a tenth summing signal S10. The fourth multiplier 64, electrically connected to the tenth adder 62 and the sixth adder 46, receives the tenth summing signal S10 and the second compensation coefficient W2, and multiplies the tenth summing signal S10 by the second compensation coefficient W2 to generate the fourth correction signal R4.

The positive DC level voltages comprise a first positive DC level voltage V1 and a second positive DC level voltage V2, the negative DC level voltages comprise a first negative DC level voltage −V1 and a second negative DC level voltage −V2, and the absolute values of the first positive DC level voltage V1 and the second positive DC level voltage V2 are respectively equal to the absolute values of the first negative DC level voltage −V1 and the second negative DC level voltage −V2. The automatic level tracking engine 14 further comprises at least two automatic level trackers. In the embodiment, the number of the automatic level trackers is two. The automatic level tracking engine 14 further comprises a fifth multiplier 66, a first pattern filter 68, an eleventh adder 70, a seventh latch 72, a first inverter 74, a twelfth adder 76, an eighth latch 78, a first multiplexer 80, a first signal selector 82, a first integrator 84, a sixth multiplier 86, a thirteenth adder 88, a ninth latch 90, a second inverter 92, a fourteenth adder 94, a tenth latch 96, a second multiplexer 98, a second signal selector 100, a second integrator 102, a seventh multiplier 104, a fifteenth adder 106, an eleventh latch 108, a third inverter 110, a sixteenth adder 112, a twelfth latch 114, a third multiplexer 116, a third integrator 118, and an eighth multiplier 120. The eleventh adder 70, the seventh latch 72, the first inverter 74, the twelfth adder 76, the eighth latch 78, the first multiplexer 80, the first signal selector 82, the first integrator 84, and the sixth multiplier 86 form one automatic level tracker. The thirteenth adder 88, the ninth latch 90, the second inverter 92, the fourteenth adder 94, the tenth latch 96, the second multiplexer 98, the second signal selector 100, the second integrator 102, and the seventh multiplier 104 form another automatic level tracker. The first signal selector 82 may be a buffer, and the second signal selector 100 may be composed of a buffer and an inverter.

The fifth multiplier 66, electrically connected to the first adder 24, receives the first summing signal S1 and multiplies it by negative one to generate a negative summing signal NS. The first pattern filter 68, electrically connected to the three first latches 30, receives the three first digital values D1. The first pattern filter 68 uniformly divides all the binary codes into a first group and a second group, and the binary codes of the first group are greater than the binary codes of the second group. The first pattern filter 68 sequentially pairs the binary codes of the first group from high to low with the binary codes of the second group from low to high, uses the two paired binary codes to correspond to a first value U1 or a second value U2, and outputs the first value U1 or the second value U2. For example, 000 and 111 belong to the first group and 001 and 011 belong to the second group. 000 is paired with 111. 000 and 111 correspond to 1 used as the first value U1. 001 is paired with 011. 001 and 011 correspond to −1 used as the second value U2.

The eleventh adder 70, electrically connected to the fifth multiplier 66, receives and adds the negative summing signal NS and the first positive DC level voltage V1 to generate an eleventh summing signal S11. The seventh latch 72, electrically connected to the eleventh adder 70, receives and compares the second clock signal C2 and the eleventh summing signal S11 to generate a seventh digital value. The first inverter 74, electrically connected to the seventh latch 72, receives and inverts the seventh digital value to generate a first inverted digital value ID1. The twelfth adder 76, electrically connected to the fifth multiplier 66, receives and adds the negative summing signal NS and the first negative DC level voltage −V1 to generate a twelfth summing signal S12. The eighth latch 78, electrically connected to the twelfth adder 76, receives and compares the second clock signal C2 and the twelfth summing signal S12 to generate an eighth digital value D8. The first multiplexer 80, electrically connected to the first inverter 74, the eighth latch 78, and the first latch 30 corresponding to the first summing signal S1, receives the first inverted digital value ID1, the eighth digital value D8, and the first digital value D1 corresponding to the first summing signal S1, thereby outputting a first output value O1. The first multiplexer 80 selects the first inverted digital value ID1 as the first output value O1 when the first digital value D1 corresponding to the first summing signal S1 is 1, and the first multiplexer 80 selects the eighth digital value D8 as the first output value O1 when the first digital value D1 corresponding to the first summing signal S1 is 0. The first signal selector 82, electrically connecting the first multiplexer 80 and the first pattern filter 84, receives the first value U1 and the first output value O1. When the first pattern filter 68 outputs the first value U1, the first signal selector 82 outputs the first output value O1. The first signal selector 82 outputs 0 when the first pattern filter 68 outputs the second value U2. The first integrator 84, electrically connected to the first signal selector 82 and the eleventh adder 70, receives and integrates the first output value O1 to generate the first positive DC level voltage V1. The sixth multiplier 86, electrically connected to the first integrator 84 and the twelfth adder 76, receives the first positive DC level voltage V1 and multiplies it by negative one to generate the first negative DC level voltage −V1. The first signal selector 82 cooperates with the first pattern filter 68, such that the data belonging to the second positive DC level voltage V2 cannot be transmitted to the first integrator 84.

The thirteenth adder 88, electrically connected to the fifth multiplier 66, receives and adds the negative summing signal NS and the second positive DC level voltage V2 to generate a thirteenth summing signal S13. The ninth latch 90, electrically connected to the thirteenth adder 88, receives and compares the second clock signal C2 and the thirteenth summing signal S13 to generate a ninth digital value. The second inverter 92, electrically connected to the ninth latch 90, receives and inverts the ninth digital value to generate a second inverted digital value ID2. The fourteenth adder 94, electrically connected to the fifth multiplier 66, receives and adds the negative summing signal NS and the second negative DC level voltage −V2 to generate a fourteenth summing signal S14. The tenth latch 96, electrically connected to the fourteenth adder 94, receives and compares the second clock signal C2 and the fourteenth summing signal S14 to generate an tenth digital value D10. The second multiplexer 98, electrically connected to the second inverter 92, the tenth latch 96, and the first latch 30 corresponding to the first summing signal S1, receives the second inverted digital value ID2, the tenth digital value D10, and the first digital value D1 corresponding to the first summing signal S1, thereby outputting a second output value O2. The second multiplexer 98 selects the second inverted digital value ID2 as the second output value O2 when the first digital value D1 corresponding to the first summing signal S1 is 1, and the second multiplexer 98 selects the tenth digital value D10 as the second output value O2 when the first digital value D1 corresponding to the first summing signal S1 is 0. The second signal selector 100, electrically connected to the second multiplexer 98 and the first pattern filter 68, receives the second value U2 and the second output value O2. When the first pattern filter 68 outputs the second value U2, the second signal selector 100 outputs the second output value O2. When the first pattern filter 68 outputs the first value U1, the second signal selector 100 outputs 0. The second integrator 102, electrically connected to the second signal selector 100 and the thirteenth adder 88, receives and integrates the second output value O2 to generate the second positive DC level voltage V2. The seventh multiplier 104, electrically connected to the second integrator 102 and the fourteenth adder 94, receives the second positive DC level voltage V2 and multiplies it by negative one to generate the second negative DC level voltage −V2. The second signal selector 100 cooperates with the first pattern filter 68, such that the data belonging to the first positive DC level voltage V1 cannot be transmitted to the second integrator 102.

The fifteenth adder 106, electrically connected to the fifth multiplier 66, receives and adds the negative summing signal NS and the positive threshold voltage PT to generate a fifteenth summing signal S15. The eleventh latch 108, electrically connected to the fifteenth adder 106, receives and compares the second clock signal C2 and the fifteenth summing signal S15 to generate an eleventh digital value. The third inverter 110, electrically connected to the eleventh latch 108, receives and inverts the eleventh digital value to generate a third inverted digital value ID3. The sixteenth adder 112, electrically connected to the fifth multiplier 66, receives and adds the negative summing signal NS and the negative threshold voltage NT to generate a sixteenth summing signal S16. The twelfth latch 114, electrically connected to the sixteenth adder 112, receives and compares the second clock signal C2 and the sixteenth summing signal S16 to generate an twelfth digital value D12. The third multiplexer 116, electrically connected to the third inverter 110, the twelfth latch 114, and the first latch 30 corresponding to the first summing signal S1, receives the third inverted digital value ID3, the twelfth digital value D12, and the first digital value D1 corresponding to the first summing signal S1, thereby outputting a third output value O3. The third multiplexer 116 selects the third inverted digital value ID3 as the third output value O3 when the first digital value D1 corresponding to the first summing signal S1 is 1, and the third multiplexer 116 selects the twelfth digital value D12 as the third output value O3 when the first digital value D1 corresponding to the first summing signal S1 is 0. The third integrator 118, electrically connected to the third multiplexer 116, the fifteenth adder 106, the third adder 28, and the seventh adder 48, receives and integrates the third output value O3 to generate the positive threshold voltage PT. The eighth multiplier 120, electrically connected to the third integrator 118, the second adder 26, and the eighth adder 50, receives the positive threshold voltage PT and multiplies it by negative one to generate the negative threshold voltage NT.

The LMS engine 18, electrically connected to the first adder 24, the three first latches 30, the first integrator 84, the sixth multiplier 86, the second integrator 102, the seventh multiplier 104, the second multiplier 42, the third multiplier 60, the fifth latch 54 corresponding to the sixth summing signal S6, the first multiplier 38, the fourth multiplier 64, and the third latch 34 corresponding to the first summing signal S1, receives the first summing signal S1, the three first digital values D1, the fifth digital value D5 corresponding to the sixth summing signal S6, and the third digital value D3 corresponding to the first summing signal D1, thereby generating the first compensation coefficient W1 and the second compensation coefficient W2. Specifically, the LMS engine 18 further comprises at least two voltage processors. In the embodiment, the number of the voltage processors is two. The LMS engine 18 comprises a ninth multiplier 122, a second pattern filter 124, a seventeenth adder 126, a thirteenth latch 128, an eighteenth adder 130, a fourteenth latch 132, a fourth multiplexer 134, a nineteenth adder 136, a fifteenth latch 138, a twentieth adder 140, a sixteenth latch 142, a fifth multiplexer 144, a sixth multiplexer 146, a tenth multiplier 148, a fourth integrator 150, an eleventh multiplier 152, and a fifth integrator 154. The seventeenth adder 126, the thirteenth latch 128, the eighteenth adder 130, the fourteenth latch 132, and the fourth multiplexer 134 form one voltage processor. The nineteenth adder 136, the fifteenth latch 138, the twentieth adder 140, the sixteenth latch 142, and the fifth multiplexer 144 form another voltage processor.

The ninth multiplier 122, electrically connected to the first adder 24, receives the first summing signal S1 and multiplies it by negative one to generate the negative summing signal NS. The second pattern filter 124, electrically connected to the three first latches 30, receives the three first digital values D1. The second pattern filter 124 uniformly divides all the binary codes into a third group and a fourth group, and the binary codes of the third group are greater than the binary codes of the fourth group. The second pattern filter 124 sequentially pairs the binary codes of the third group from high to low with the binary codes of the fourth group from low to high, uses the two paired binary codes to correspond to a third value U3 or a fourth value U4, and outputs the third value U3 or the fourth value U4. For example, 000 and 111 belong to the third group, and 001 and 011 belong to the fourth group. 000 is paired with 111 and 000 and 111 correspond to 1 used as the third value U3. 001 is paired with 011 and 001 and 011 correspond to −1 used as the fourth value U4.

The seventeenth adder 126, electrically connected to the ninth multiplier 122 and the first integrator 84, receives and adds the negative summing signal NS and the first positive DC level voltage V1 to generate a seventeenth summing signal S17. The thirteenth latch 128, electrically connected to the seventeenth adder 126, receives and compares the second clock signal C2 and the seventeenth summing signal S17 to generate a thirteenth digital value D13. The eighteenth adder 130, electrically connected to the ninth multiplier 122 and the sixth multiplier 86, receives and adds the negative summing signal NS and the first negative DC level voltage −V1 to generate an eighteenth summing signal S18.

The fourteenth latch 132, electrically connected to the eighteenth adder 13, receives and compares the second clock signal C2 and the eighteenth summing signal S18 to generate a fourteenth digital value D14. The fourth multiplexer 134, electrically connected to the thirteenth latch 128, the fourteenth latch 132, and the first latch 30 corresponding to the first summing signal S1, receives the thirteenth digital value D13, the fourteenth digital value D14, and the first digital value D1 corresponding to the first summing signal S1, thereby outputting a fourth output value O4. The fourth multiplexer 134 selects the thirteenth digital value D13 as the fourth output value O4 when the first digital value D1 corresponding to the first summing signal S1 is 1, and the fourth multiplexer 134 selects the fourteenth digital value D14 as the fourth output value O4 when the first digital value D1 corresponding to the first summing signal S1 is 0.

The nineteenth adder 136, electrically connected to the ninth multiplier 122 and the second integrator 102, receives and adds the negative summing signal NS and the second positive DC level voltage V2 to generate a nineteenth summing signal S19. The fifteenth latch 138, electrically connected to the nineteenth adder 136, receives and compares the second clock signal C2 and the nineteenth summing signal S19 to generate a fifteenth digital value D15. The twentieth adder 140, electrically connected to the ninth multiplier 122 and the seventh multiplier 104, receives and adds the negative summing signal NS and the second negative DC level voltage −V2 to generate a twentieth summing signal S20. The sixteenth latch 142, electrically connected to the twentieth adder 140, receives and compares the second clock signal C2 and the twentieth summing signal S20 to generate a sixteenth digital value D16. The fifth multiplexer 144, electrically connected to the fifteenth latch 138, the sixteenth latch 142, and the first latch 30 corresponding to the first summing signal S1, receives the fifteenth digital value D15, the sixteenth digital value D16, and the first digital value D1 corresponding to the first summing signal S1, thereby outputting a fifth output value O5. The fifth multiplexer 144 selects the fifteenth digital value D15 as the fifth output value O5 when the first digital value D1 corresponding to the first summing signal S1 is 1, and the fifth multiplexer 144 selects the sixteenth digital value D16 as the fifth output value O5 when the first digital value D1 corresponding to the first summing signal S1 is 0.

The sixth multiplexer 146, electrically connected to the fourth multiplexer 134, the fifth multiplexer 144, and the second pattern filter 124, receives either of the third value U3 or the fourth value U4, the fourth output value O4, and the fifth output value O5, thereby outputting a sixth output value O6. The sixth multiplexer 146 selects the fourth value U4 as the sixth output value O6 when the second pattern filter 124 outputs the third value U3, and the sixth multiplexer 146 selects the fifth value U5 as the sixth output value O6 when the second pattern filter 124 outputs the fourth value U4. The tenth multiplier 148, electrically connected to the sixth multiplexer 146 and the fifth latch 54 corresponding to the fifth summing signal S5, receives the sixth output value O6 and the fifth digital value D5 corresponding to the sixth summing signal S6, and multiplies the sixth output value O6 by the fifth digital value D5 corresponding to the sixth summing signal S6 to generate a first compensation signal P1. The fourth integrator 150, electrically connected to the tenth multiplier 148, the first multiplier 38, and the fourth multiplier 64, receives the first compensation signal P1 and integrates it to generate the first compensation coefficient W1. The eleventh multiplier 152, electrically connected to the sixth multiplexer 146 and the third latch 34 corresponding to the first summing signal S1, receives the sixth output value O6 and the third digital value D3 corresponding to the first summing signal S1 and multiplies the sixth output value O6 by the third digital value D3 corresponding to the first summing signal S1 to generate a second compensation signal P2. The fifth integrator 154, electrically connected to the eleventh multiplier 152, the second multiplier 42, and the third multiplier 60, receives the second compensation signal P2 and integrates it to generate the second compensation coefficient W2. The LMS engine 18 and the automatic level tracking engine 14 share much hardware. Thus, the LMS engine 18 is easily combined with the automatic level tracking engine 14, such that the automatic level tracking engine 14 has the competitiveness.

The automatic level tracking engine 14 provides the first positive DC level voltage V1, the first negative DC level voltage −V1, the second positive DC level voltage V2, and the second negative DC level voltage −V2, which have the low-frequency energy information of the digital data DA, for the LMS engine 18. Thus, the automatic level tracking engine 14 can be combined with the automatic gain controller 16, let the amplitude of the multi-level attenuation signal A be higher than the minimum amplitude tolerated by the receiver system.

The automatic gain controller 16 further comprises a twenty-first adder 156, a seventeenth latch 158, and a sixth integrator 160. The twenty-first adder 156, electrically connected to the sixth multiplier 86, the seventh multiplier 104, or the eighth multiplier 120, receives and adds the expected voltage PV and one of the first negative DC level voltage −V1, the second negative DC level voltage −V2, and the negative threshold voltage NT to generate a gain voltage GV. The seventeenth latch 158, electrically connected to the twenty-first adder 156, receives and compares the gain voltage GV and a third clock signal C3 whose frequency is more than 10 times slower than the frequency of the first clock signal C1 to generate a seventeenth digital value D17. The sixth integrator 160, electrically connected to the seventeenth latch 158 and the analog equalizer 10, receives and integrates the seventeenth digital value D17 to generate the gain signal G In a system analysis, the automatic gain control mechanism belongs to an outer loop and the automatic level tracking mechanism belongs to an inner loop. Besides, the automatic gain control mechanism adjusts the gain according to the DC voltage level provided by the automatic level tracking mechanism. Thus, the automatic gain control mechanism is slower than the automatic level tracking mechanism in designing bandwidth, lest there be a mismatch between the inner loop and the outer loop such that the system is in an unstable state.

The operation of the multi-level pulse-amplitude modulation receiver system is described as follows. In the operation, the analog equalizer 10, the digital equalizer 12, the automatic level tracking engine 14, the automatic gain controller 16, and the LMS engine 18 influence each other. As a result, all the signals endlessly vary and the relationships among all the signals are unchanged. Firstly, the transmission channel 20 receives the multi-level pulse-amplitude modulation signal M and attenuates it to output the multi-level attenuation signal A to the analog equalizer 10. The analog equalizer 10 uses the gain signal G to perform signal compensation on the multi-level attenuation signal A to generate the multi-level compensation signal P. Then, the first sampling and holding circuit 22, the first adder 24, the second adder 26, the third adder 28, the first latches 30, the second latches 32, the third latches 34, the fourth adder 36, the first multiplier 38, the fifth adder 40, the second multiplier 42, the second sampling and holding circuit 44, the sixth adder 46, the seventh adder 48, the eighth adder 50, the fourth latches 52, the fifth latches 54, the sixth latches 56, the ninth adder 58, the third multiplier 60, the tenth adder 62, and the fourth multiplier 64 receive the multi-level compensation signal P, the first clock signal C1, the second clock signal C2, the positive threshold voltage PT, the negative threshold voltage NT, the first compensation coefficient W1, and the second compensation coefficient W2 to perform the corresponding operation and generate the first summing signal S1, the first digital value D1, the second digital value D2, the third digital value D3, the fourth digital value D4, the fifth digital value D5, and the sixth digital value D6.

Then, the fifth multiplier 66, the first pattern filter 68, the eleventh adder 70, the seventh latch 72, the first inverter 74, the twelfth adder 76, the eighth latch 78, the first multiplexer 80, the first signal selector 82, the first integrator 84, the sixth multiplier 86, the thirteenth adder 88, the ninth latch 90, the second inverter 92, the fourteenth adder 94, the tenth latch 96, the second multiplexer 98, the second signal selector 100, the second integrator 102, the seventh multiplier 104, the fifteenth adder 106, the eleventh latch 108, the third inverter 110, the sixteenth adder 112, the twelfth latch 114, the third multiplexer 116, the third integrator 118, and the eighth multiplier 120 receive all the first digital values D1 and the first summing signal S1 to perform the corresponding operation and generate the first positive DC level voltage V1, the second positive DC level voltage V2, the first negative DC level voltage −V1, the second negative DC level voltage −V2, the positive threshold voltage PT, and the negative threshold voltage NT.

Then, the ninth multiplier 122, the second pattern filter 124, the seventeenth adder 126, the thirteenth latch 128, the eighteenth adder 130, the fourteenth latch 132, the fourth multiplexer 134, the nineteenth adder 136, the fifteenth latch 138, the twentieth adder 140, the sixteenth latch 142, the fifth multiplexer 144, the sixth multiplexer 146, the tenth multiplier 148, the fourth integrator 150, the eleventh multiplier 152, and the fifth integrator 154 receive the first summing signal S1, all the first digital values D1, the fifth digital value D5 corresponding to the sixth summing signal S6, and the third digital value D3 corresponding to the first summing signal S1 to perform the corresponding operation and generate the first compensation coefficient W1 and the second compensation coefficient W2.

Simultaneously, the twenty-first adder 156 receives and adds the expected voltage PV and one of the first negative DC level voltage −V1, the second negative DC level voltage −V2, and the negative threshold voltage NT to generate the gain voltage GV. The seventeenth latch 158 receives and compares the gain voltage GV and the third clock signal C3 to generate the seventeenth digital value D17. The sixth integrator 160 receives and integrates the seventeenth digital value D17 to generate the gain signal G.

Figure 6:
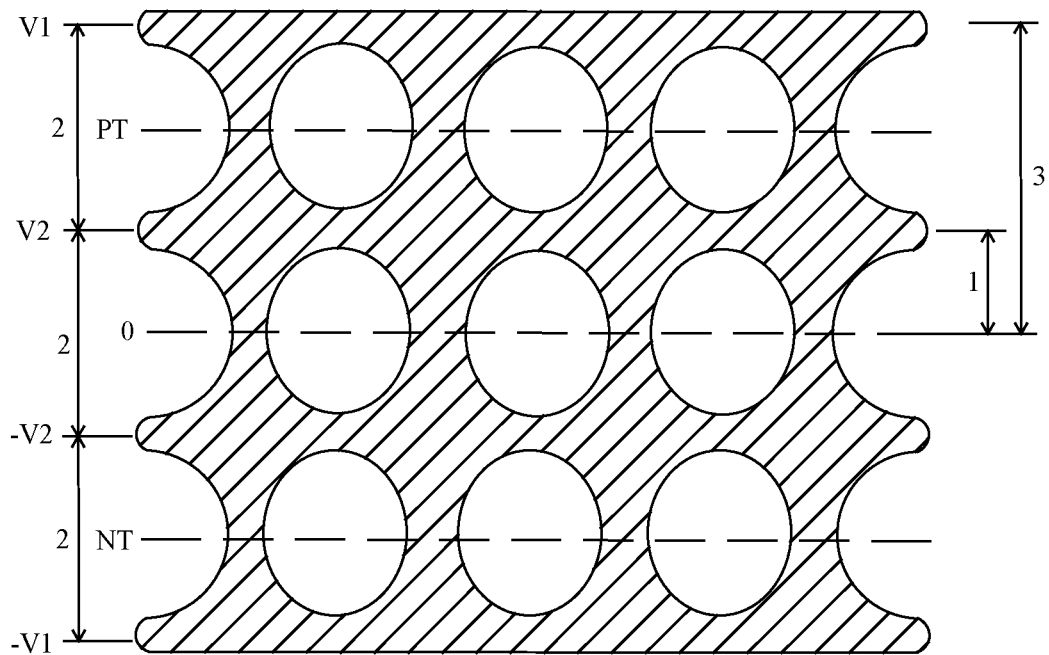
FIG. 6 is an eye diagram of a four-level pulse-amplitude modulation signal of the present invention.
Figure 7:
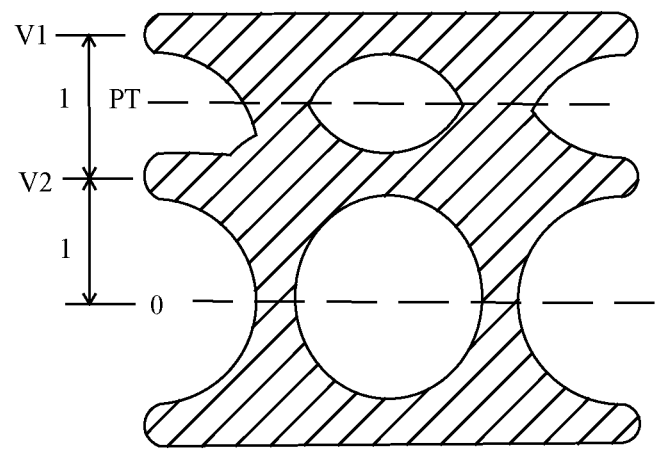
FIG. 7 is an eye diagram of a multi-level attenuation signal of the present invention.

Refer to FIG. 1 and FIG. 6. FIG. 6 is an eye diagram of a four-level pulse-amplitude modulation signal of the present invention. In other words, the four-level pulse-amplitude modulation signal M is not distorted. The positive threshold voltage PT, the negative threshold voltage NT, the first positive DC level voltage V1, the second positive DC level voltage V2, the first negative DC level voltage −V1, and the second negative DC level voltage −V2 are shown in FIG. 6, wherein the second positive DC level voltage V2 equals to ⅓ multiplied by the first positive DC level voltage V1. However, the multi-level attenuation signal A received by the multi-level pulse-amplitude modulation receiver system is distorted, as shown in FIG. 7. In fact, the second positive DC level voltage V2 equals to ½ multiplied by the first positive DC level voltage V1. The present adaptive design used for the four-level pulse-amplitude modulation receiver is still influenced by the distorted data, and the influences will greatly reduce the efficiency of the receiver when the amplitude of the input data is larger or the analog front end of the receiver receives the signal with more nonlinear components. In the existing technology, the second positive DC level voltage V2 still equals to ½ multiplied by the first positive DC level voltage V1 when receiving the distorted multi-level attenuation signal A. Consequently, the receiver is influenced due to the nonlinear properties of the analog front end. The present invention uses the digital equalizer 12 and the automatic level tracking engine 14 to generate at least one threshold voltage and at least two DC level voltages and converge them to ideal values, such that the threshold voltage is an average of the two DC level voltages, thereby eliminating multi-level inter-symbol interference and the nonlinear influences of the analog front end. Thus, the digital equalizer 12 has a maximum voltage margin and better bit error rate performance.

Figure 3:
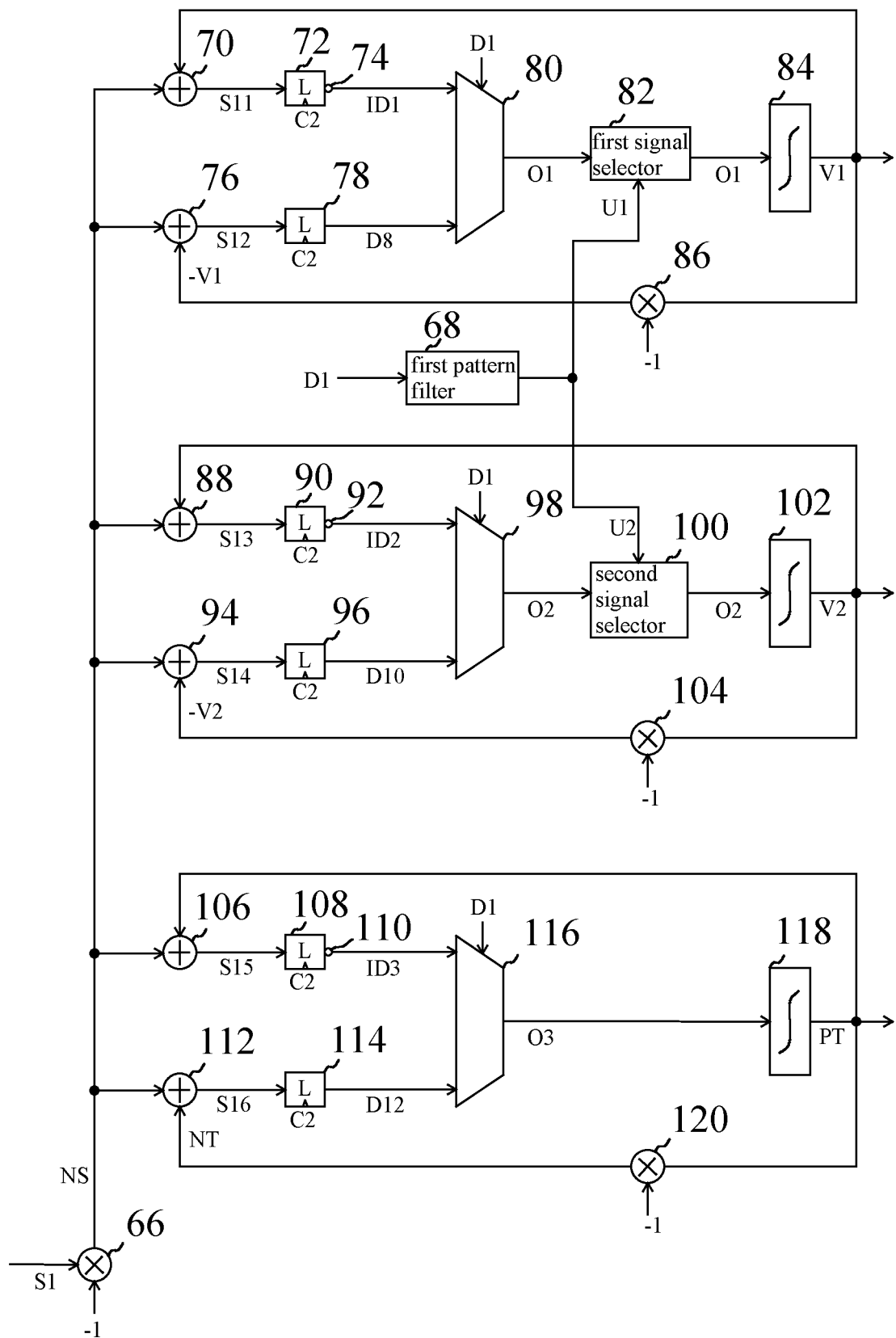
FIG. 3 is a diagram schematically showing an automatic level tracking engine according to an embodiment of the present invention.
Figure 4:
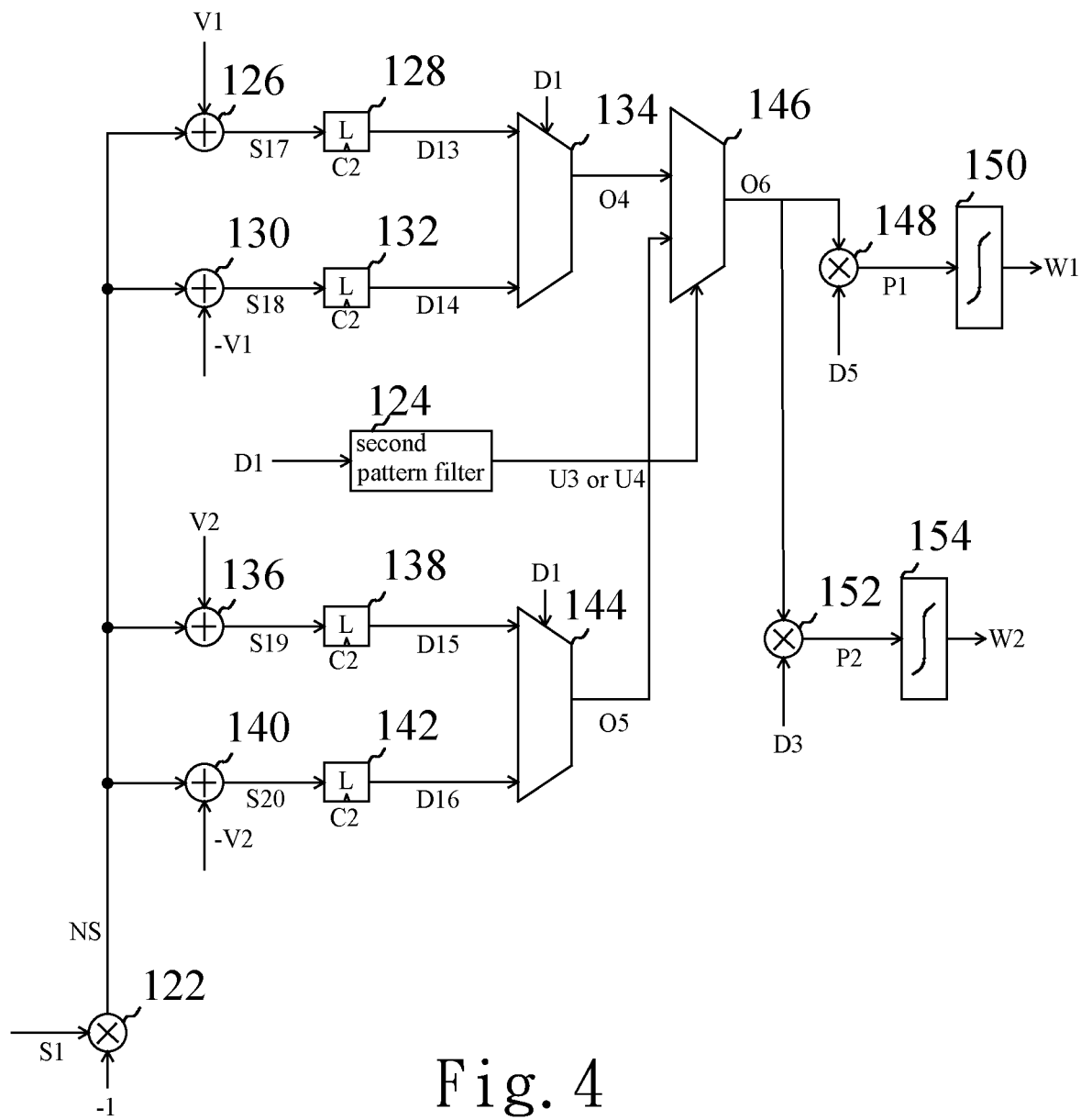
FIG. 4 is a diagram schematically showing a least mean square engine according to an embodiment of the present invention.
Figure 5:
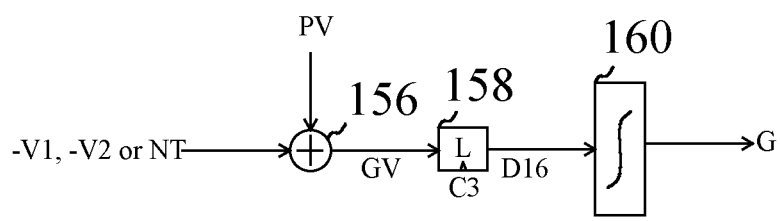
FIG. 5 is a diagram schematically showing an automatic gain controller according to an embodiment of the present invention.
Figure 8:
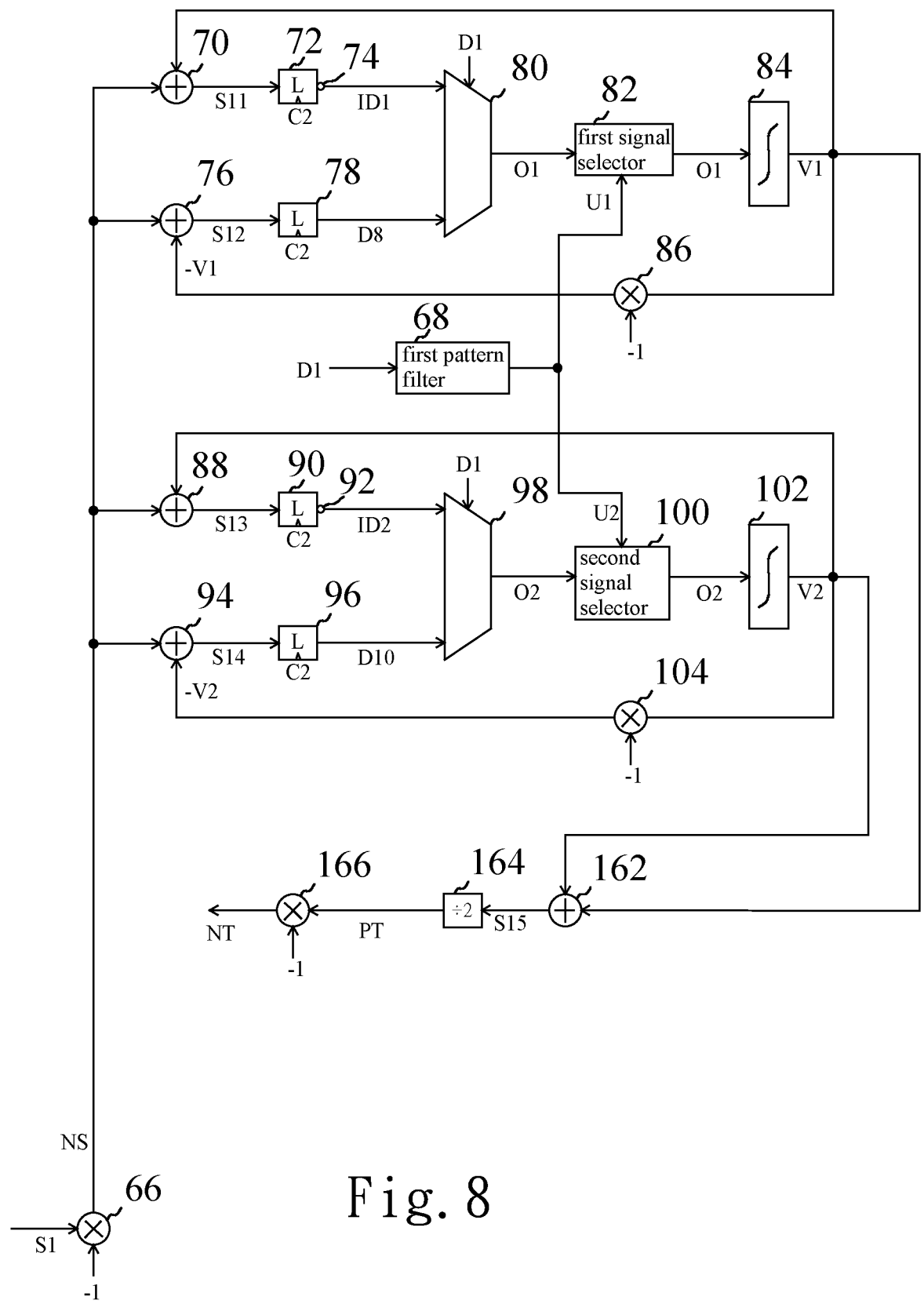
FIG. 8 is a diagram schematically showing an automatic level tracking engine according to another embodiment of the present invention.
Figure 9:
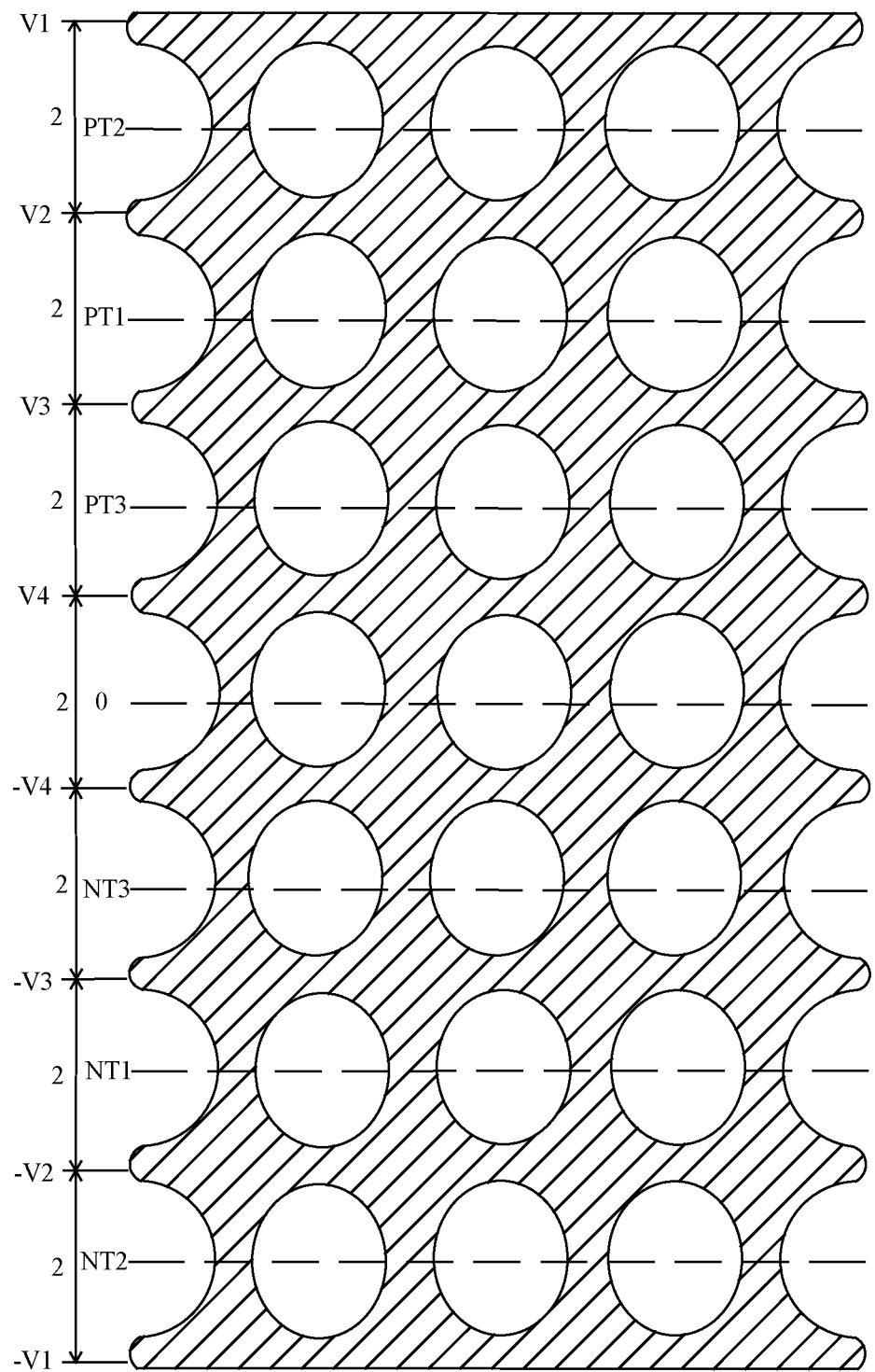
FIG. 9 is an eye diagram of an eight-level pulse-amplitude modulation signal of the present invention.

Refer to FIG. 8 and FIG. 3. Another automatic level tracking engine is introduced as follows. Compared with FIG. 3, the automatic level tracking engine of FIG. 8 lacks more hardware to consume fewer energy. As shown in FIG. 8, the automatic level tracking engine comprises a fifth multiplier 66, a first pattern filter 68, an eleventh adder 70, a seventh latch 72, a first inverter 74, a twelfth adder 76, an eighth latch 78, a first multiplexer 80, a first signal selector 82, a first integrator 84, a sixth multiplier 86, a thirteenth adder 88, a ninth latch 90, a second inverter 92, a fourteenth adder 94, a tenth latch 96, a second multiplexer 98, a second signal selector 100, a second integrator 102, a seventh multiplier 104, a fifteenth adder 162, a divider 164, and an eighteenth multiplier 166. Since the connection relationships and operation of the fifth multiplier 66, the first pattern filter 68, the eleventh adder 70, the seventh latch 72, the first inverter 74, the twelfth adder 76, the eighth latch 78, the first multiplexer 80, the first signal selector 82, the first integrator 84, the sixth multiplier 86, the thirteenth adder 88, the ninth latch 90, the second inverter 92, the fourteenth adder 94, the tenth latch 96, the second multiplexer 98, the second signal selector 100, the second integrator 102, and the seventh multiplier 104 have been described previously so will not be reiterated. The fifteenth adder 162, electrically connected to the first integrator 84 and the second integrator 102, receives and adds the first positive DC level voltage V1 and the second positive DC level voltage V2 to generate a fifteenth summing signal S15. The divider 164, electrically connected to the fifteenth adder 162, the third adder 28, and the seventh adder 48, receives the fifteenth summing signal S15 and dividing it by two to generate the positive threshold voltage PT. The eighth multiplier 166, electrically connected to the divider 164, the second adder 26, and the eighth adder 50, receives the positive threshold voltage PT and multiplies it by negative one to generate the negative threshold voltage NT.

Figure 2:
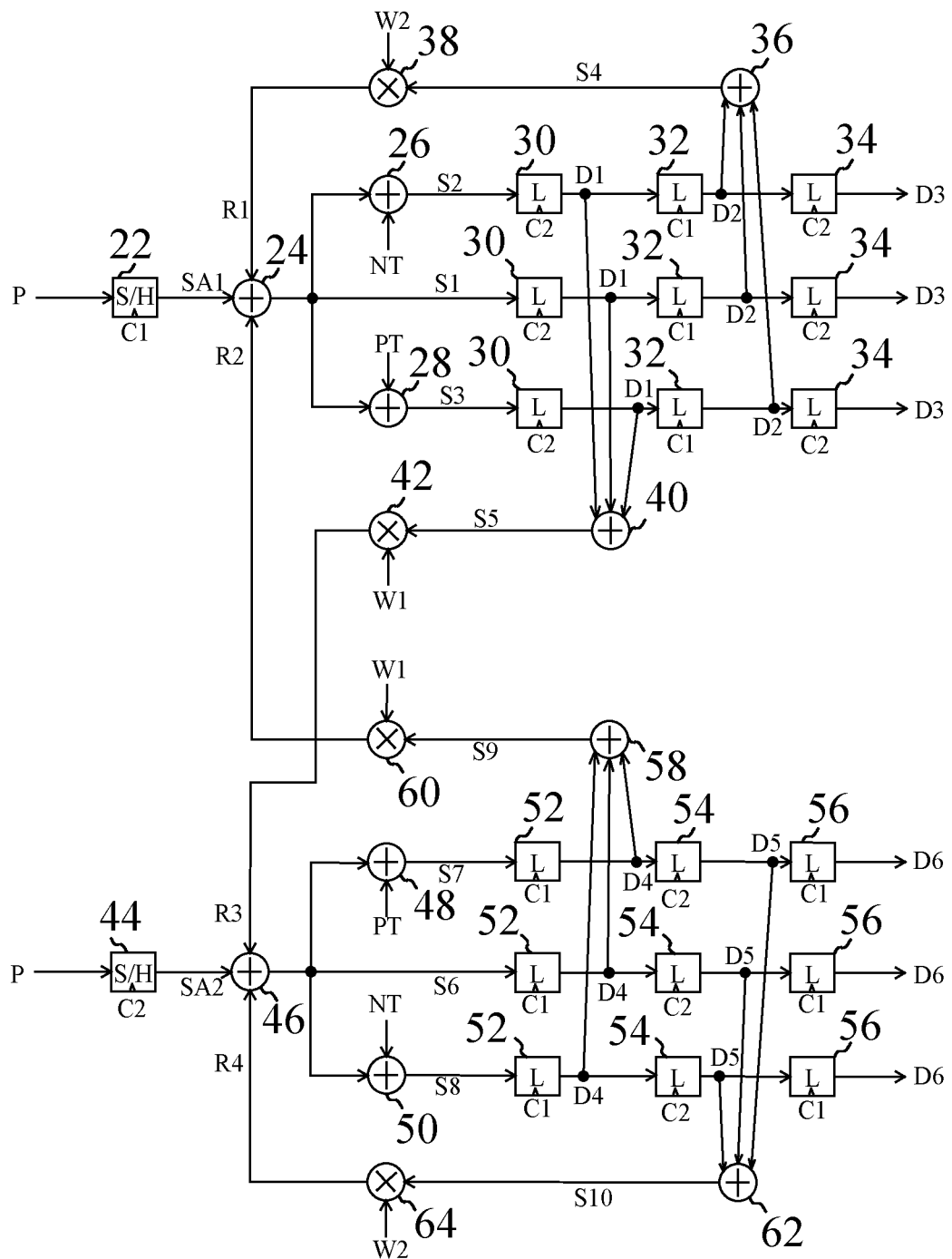
FIG. 2 is a diagram schematically showing a digital equalizer according to an embodiment of the present invention.

Refer to FIG. 1, Fig., FIG. 3, FIG. 4, FIG. 5, and FIG. 9. The present invention alternatively uses an eight-level pulse-amplitude modulation signal as the multi-level pulse-amplitude modulation signal M. When the multi-level pulse-amplitude modulation signal M is an eight-level pulse-amplitude modulation signal, the amount of the digital data DA is eight. The number of the first latches 30 is seven. The number of the second latches 32 is seven. The number of the third latches 34 is seven. The number of the fourth latches 50 is seven. The number of the fifth latches 52 is seven. The number of the sixth latches 54 is seven. The number of the first digital values D1 is seven. The number of the second digital values D2 is seven. The number of the third digital values D3 is seven. The number of the fourth digital values D4 is seven. The number of the fifth digital values D5 is seven. The number of the sixth digital values D6 is seven. The number of the second adders 26 is three. The number of the third adders 28 is three. The number of the seventh adders 46 is three. The number of the eighth adders 48 is three. The number of the positive threshold voltages PT1, PT2, and PT3 is three. The number of the negative threshold voltages NT1, NT2, and NT3 is three. The number of the second summing signal S2 is three. The number of the third summing signal S3 is three. The number of the seventh summing signal S7 is three. The number of the eighth summing signal S8 is three. The number of the positive DC level voltages is four. The number of the negative DC level voltages is four. The number of the automatic level trackers is four. The number of the voltage processors is four. The positive DC level voltages comprises a first positive DC level voltage V1, a second positive DC level voltage V2, a third positive DC level voltage V3, and a fourth positive DC level voltage V4. The negative DC level voltages comprises a first negative DC level voltage −V1, a second negative DC level voltage −V2, a third negative DC level voltage −V3, and a fourth negative DC level voltage −V4. The absolute values of the positive threshold voltages PT1, PT2, and PT3 respectively equal to those of the negative threshold voltages NT1, NT2, and NT3. The absolute values of the first positive DC level voltage V1, the second positive DC level voltage V2, the third positive DC level voltage V3, and the fourth positive DC level voltage V4 respectively equal to those of the first negative DC level voltage −V1, the second negative DC level voltage −V2, the third negative DC level voltage −V3, and the fourth negative DC level voltage −V4. As shown in FIG. 2, the three second adders 26 respectively receive the negative threshold voltages NT1, NT2, and NT3, the three third adders 28 respectively receive the positive threshold voltages PT1, PT2, and PT3, and the three eighth adders 50 respectively receive the negative threshold voltages NT1, NT2, and NT3. When the number of the automatic level trackers is four, the first pattern filter 68 receives the seven first digital values D1. Since the amount of the digital data DA is eight, the digital data DA include 0000000, 0000001, 0000011, 0000111, 0001111, 0011111, 0111111, and 1111111. 0000000 is paired with 1111111 to correspond to the first value. 0000001 is paired with 0111111 to correspond to the second value. 0000011 is paired with 0011111 to correspond to the third value. 0000111 is paired with 0001111 to correspond to the fourth value. Therefore, the first pattern filter 62 may output the first value, the second value, the third value, or the fourth value, such that the four automatic level trackers respectively the first positive DC level voltage V1, the second positive DC level voltage V2, the third positive DC level voltage V3, and the fourth positive DC level voltage V4. As shown in FIG. 3, when the first pattern filter 68 receives the positive threshold voltage PT1, the first summing signal S1, and the first digital value D1 corresponding to the negative threshold summing NT1, the first integrator 84, the second integrator 102, and the third integrator 118 respectively generate the positive threshold voltages PT2, PT3, and PT1. The sixth multiplier 86, the seventh multiplier 104, and the eighth multiplier 120 respectively generate the negative threshold voltages NT2, NT3, and NT1.

In conclusion, the present invention uses the digital equalizer and the automatic level tracking engine to generate at least one threshold voltage and at least two DC level voltages, and converges them to ideal values, so that the threshold voltage is an average of two DC level voltages, thereby eliminating multi-level inter-symbol interference and the nonlinear influences of the analog front end. Thus, the digital equalizer has a maximum voltage margin and better bit error rate performance.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A multi-level pulse-amplitude modulation receiver system comprising:
    an analog equalizer, electrically connected to a transmission channel, receiving a gain signal, the transmission channel receives a multi-level pulse-amplitude modulation signal and attenuates the multi-level pulse-amplitude modulation signal to output a multi-level attenuation signal to the analog equalizer, and the analog equalizer uses the gain signal to perform signal compensation on the multi-level attenuation signal to generate a multi-level compensation signal;
    a digital equalizer, electrically connected to the analog equalizer, receiving the multi-level compensation signal, at least one positive threshold voltage, at least one negative threshold voltage, a first clock signal, and a second clock signal, absolute values of the at least one positive threshold voltage and the at least one negative threshold voltage are equal, the second clock signal is an inverted the first clock signal, and the digital equalizer utilizes the at least one positive threshold voltage, the at least one negative threshold voltage, the first clock signal and the second clock signal to sequentially convert the multi-level compensation signal into a plurality of digital data, and number of the digital data is a positive integer multiple of four;
    an automatic level tracking engine, electrically connected to the digital equalizer, receiving the second clock signal and the digital data to generate the at least one positive threshold voltage, the at least one negative threshold voltage, at least two second positive DC level voltages and at least two negative DC level voltages, absolute values of the at least two positive DC level voltages are respectively equal to absolute values of the at least two negative DC level voltages, and the at least one positive threshold voltage is an average of the two positive DC level voltages; and
    an automatic gain controller, electrically connected to the automatic level tracking engine and the analog equalizer, receiving an expected voltage and one of the at least one negative threshold voltage and the at least two negative DC level voltages to generate the gain signal.

2. The multi-level pulse-amplitude modulation receiver system according to claim 1, wherein the digital equalizer is a decision feedback equalizer (DFE).

3. The multi-level pulse-amplitude modulation receiver system according to claim 2, wherein each of the digital data is a binary code, which is composed of at least three first digital values, and DFE further comprises:
    a first sampling and holding circuit, electrically connected to the analog equalizer, receiving the multi-level compensation signal and the first clock signal and using the first clock signal to sample the multi-level compensation signal, thereby generating a first multi-level sampling signal;
    a first adder, electrically connected to the first sampling and holding circuit, receiving and adding the first multi-level sampling signal, a first correction signal and a second correction signal to generate a first summing signal;
    at least one second adder, electrically connected to the first adder, receiving and adding the at least one negative threshold voltage and the first summing signal to generate at least one second summing signal;
    at least one third adder, electrically connected to the first adder, receiving and adding the at least one positive threshold voltage and the first summing signal to generate at least one third summing signal;
    at least three first latches, respectively electrically connected to the at least one second adder, the first adder and the at least one third adder, respectively receiving the at least one second summing signal, the first summing signal and the at least one third summing signal, receiving the second clock signal, and respectively comparing the at least one second summing signal, the first summing signal, and the at least one third summing signal with the second clock signal to respectively generate the at least three first digital values;
    at least three second latches, respectively electrically connected to the at least three first latches, respectively receiving the at least three first digital values, receiving the first clock signal, and respectively comparing the at least three first digital values with the first clock signal to respectively generate at least three second digital values;
    at least three third latches, respectively electrically connected to the at least three second latches, respectively receiving the at least three second digital values, receiving the second clock signal, and respectively comparing the at least three second digital values with the second clock signal to respectively generate at least three third digital values;
    a fourth adder, electrically connected the at least three second latches, receiving and adding the at least three second digital values to generate a fourth summing signal;
    a first multiplier, electrically connected to the first adder and the fourth adder, receiving the fourth summing signal and a second compensation coefficient, and multiplying the fourth summing signal by the second compensation coefficient to generate the first correction signal;
    a fifth adder, electrically connected to the at least three first latches, receiving and adding the at least three first digital values to generate a fifth summing signal;
    a second multiplier, electrically connected to the fifth adder, receiving the fifth summing signal and a first compensation coefficient and multiplying the fifth summing signal by the first compensation coefficient to generate a third correction signal;
    a second sampling and holding circuit, electrically connected to the analog equalizer, receiving the multi-level compensation signal and the second clock signal and using the second clock to sample the multi-level compensation signal, thereby generating a second multi-level sampling signal;
    a sixth adder, electrically connected to the second sampling and holding circuit and the second multiplier, receiving and adding the second multi-level sampling signal, the third correction signal, and a fourth correction signal to generate a sixth summing signal;

at least one seventh adder, electrically connected to the sixth adder, receiving and adding the at least one positive threshold voltage and the sixth summing signal to generate at least one seventh summing signal;

at least one eighth adder, electrically connected to the sixth adder, receiving and adding the at least one negative threshold voltage and the sixth summing signal to generate at least an eighth summing signal;

at least three fourth latches, respectively electrically connected to the at least one seventh adder, the sixth adder and the at least one eighth adder, respectively receiving the at least one seventh summing signal, the sixth summing signal, and the at least one eighth summing signal, receiving the first clock signal, and respectively comparing the at least one seventh summing signal and the sixth summing signal, and the at least one eighth summing signal with the first clock signal to respectively generate at least three fourth digital values;

at least three fifth latches, respectively electrically connected to the at least three fourth latches, respectively receiving the at least three fourth digital values, receiving the second clock signal, and respectively comparing the at least three fourth digital values with the second clock signal to respectively generate at least three fifth digital values;

at least three sixth latches, respectively electrically connected to the at least three fifth latches, respectively receiving the at least three fifth digital values, receiving the first clock signal, and respectively comparing the at least three fifth digital values with the first clock signal to respectively generate at least three sixth digital values;

a ninth adder, electrically connected to the at least three fourth latches, receiving and adding the at least three fourth digital values to generate a ninth summing signal;

a third multiplier, electrically connected to the ninth adder and the first adder, receiving the ninth summing signal and the first compensation coefficient and multiplying the ninth summing signal by the first compensation coefficient to generate the second correction signal;

a tenth adder, electrically connected to the at least three fifth latches, receiving and adding the at least three fifth digital values to generate a tenth summing signal; and a fourth multiplier, electrically connected to the tenth adder and the sixth adder, receiving the tenth summing signal and the second compensation coefficient, and multiplying the tenth summing signal by the second compensation coefficient to generate the fourth correction signal.

4. The multi-level pulse-amplitude modulation receiver system according to claim 3, wherein the at least two positive DC level voltages comprise a first positive DC level voltage and a second positive DC level voltage, the at least two negative DC level voltages comprise a first negative DC level voltage and a second negative DC level voltage, absolute values of the first positive DC level voltage and the second positive DC level voltage are respectively equal to absolute values of the first negative DC level voltage and the second negative DC level voltage, and the automatic level tracking engine further comprises:

a fifth multiplier, electrically connected to the first adder, receiving the first summing signal and multiplying it by negative one to generate a negative summing signal;

a first pattern filter, electrically connected to the at least three first latches, receiving the at least three first digital values, the first pattern filter uniformly divides all the binary codes into a first group and a second group, the binary codes of the first group are greater than the binary codes of the second group, the first pattern filter sequentially pairs the binary codes of the first group from high to low with the binary codes of the second group from low to high, uses two paired the binary codes to correspond to a first value or a second value, and outputs the first value or the second value;

an eleventh adder, electrically connected to the fifth multiplier, receiving and adding the negative summing signal and the first positive DC level voltage to generate an eleventh summing signal;

a seventh latch, electrically connected to the eleventh adder, receiving and comparing the second clock signal and the eleventh summing signal to generate a seventh digital value;

a first inverter, electrically connected to the seventh latch, receiving and inverting the seventh digital value to generate a first inverted digital value;

a twelfth adder, electrically connected to the fifth multiplier, receiving and adding the negative summing signal and the first negative DC level voltage to generate a twelfth summing signal;

an eighth latch, electrically connected to the twelfth adder, receiving and comparing the second clock signal and the twelfth summing signal to generate an eighth digital value;

a first multiplexer, electrically connected to the first inverter, the eighth latch, and the first latch corresponding to the first summing signal, receiving the first inverted digital value, the eighth digital value, and the first digital value corresponding to the first summing signal, thereby outputting a first output value, the first multiplexer selects the first inverted digital value as the first output value when the first digital value corresponding to the first summing signal is 1, and the first multiplexer selects the eighth digital value as the first output value when the first digital value corresponding to the first summing signal is 0;

a first signal selector, electrically connecting the first multiplexer and the first pattern filter, receiving the first value and the first output value, when the first pattern filter outputs the first value, the first signal selector outputs the first output value, and when the first pattern filter outputs the second value, the first signal selector outputs 0;

a first integrator, electrically connected to the first signal selector and the eleventh adder, receiving and integrating the first output value to generate the first positive DC level voltage;

a sixth multiplier, electrically connected to the first integrator and the twelfth adder, receiving the first positive DC level voltage and multiplying it by negative one to generate the first negative DC level voltage;

a thirteenth adder, electrically connected to the fifth multiplier, receiving and adding the negative summing signal and the second positive DC level voltage to generate a thirteenth summing signal;

a ninth latch, electrically connected to the thirteenth adder, receiving and comparing the second clock signal and the thirteenth summing signal to generate a ninth digital value;

a second inverter, electrically connected to the ninth latch, receiving and inverting the ninth digital value to generate a second inverted digital value;

a fourteenth adder, electrically connected to the fifth multiplier, receiving and adding the negative summing signal and the second negative DC level voltage to generate a fourteenth summing signal;

a tenth latch, electrically connected to the fourteenth adder, receiving and comparing the second clock signal and the fourteenth summing signal to generate an tenth digital value;

a second multiplexer, electrically connected to the second inverter, the tenth latch, and the first latch corresponding to the first summing signal, receiving the second inverted digital value, the tenth digital value, and the first digital value corresponding to the first summing signal, thereby outputting a second output value, the second multiplexer selects the second inverted digital value as the second output value when the first digital value corresponding to the first summing signal is 1, and the second multiplexer selects the tenth digital value as the second output value when the first digital value corresponding to the first summing signal is 0;

a second signal selector, electrically connected to the second multiplexer and the first pattern filter, receiving the second value and the second output value, when the first pattern filter outputs the second value, the second signal selector outputs the second output value, and when the first pattern filter outputs the first value, the second signal selector outputs 0;

a second integrator, electrically connected to the second signal selector and the thirteenth adder, receiving and integrating the second output value to generate the second positive DC level voltage;

a seventh multiplier, electrically connected to the second integrator and the fourteenth adder, receiving the second positive DC level voltage and multiplying it by negative one to generate the second negative DC level voltage;

a fifteenth adder, electrically connected to the fifth multiplier, receiving and adding the negative summing signal and the at least one positive threshold voltage to generate a fifteenth summing signal;

an eleventh latch, electrically connected to the fifteenth adder, receiving and comparing the second clock signal and the fifteenth summing signal to generate an eleventh digital value;

a third inverter, electrically connected to the eleventh latch, receiving and inverting the eleventh digital value to generate a third inverted digital value;

a sixteenth adder, electrically connected to the fifth multiplier, receiving and adding the negative summing signal and the at least one negative threshold voltage to generate a sixteenth summing signal;

a twelfth latch, electrically connected to the sixteenth adder, receiving and comparing the second clock signal and the sixteenth summing signal to generate an twelfth digital value;

a third multiplexer, electrically connected to the third inverter, the twelfth latch, and the first latch corresponding to the first summing signal, receiving the third inverted digital value, the twelfth digital value, and the first digital value corresponding to the first summing signal, thereby outputting a third output value, the third multiplexer selects the third inverted digital value as the third output value when the first digital value corresponding to the first summing signal is 1, and the third multiplexer selects the twelfth digital value as the third output value when the first digital value corresponding to the first summing signal is 0;

a third integrator, electrically connected to the third multiplexer, the fifteenth adder, the at least one third adder, and the at least one seventh adder, receiving and integrating the third output value to generate the at least one positive threshold voltage; and an eighth multiplier, electrically connected to the third integrator, the at least one second adder, and the at least one eighth adder, receiving the at least one positive threshold voltage and multiplying it by negative one to generate the at least one negative threshold voltage.

5. The multi-level pulse-amplitude modulation receiver system according to claim 4, further comprising a least mean square (LMS) engine, electrically connected to the first adder, the at least three first latches, the first integrator, the sixth multiplier, the second integrator, the seventh multiplier, the second multiplier, the third multiplier, the fifth latch corresponding to the sixth summing signal, the first multiplier, the fourth multiplier, and the third latch corresponding to the first summing signal, receiving the first summing signal, the at least three first digital values, the fifth digital value corresponding to the sixth summing signal, and the third digital value corresponding to the first summing signal, thereby generating the first compensation coefficient and the second compensation coefficient.

6. The multi-level pulse-amplitude modulation receiver system according to claim 5, wherein the LMS engine further comprises:

a ninth multiplier, electrically connected to the first adder, receiving the first summing signal and multiplying it by negative one to generate the negative summing signal;

a second pattern filter, electrically connected to the at least three first latches, receiving the at least three first digital values, the second pattern filter uniformly divides all the binary codes into a third group and a fourth group, the binary codes of the third group are greater than the binary codes of the fourth group, the second pattern filter sequentially pairs the binary codes of the third group from high to low with the binary codes of the fourth group from low to high, uses two paired the binary codes to correspond to a third value or a fourth value, and outputs the third value or the fourth value;

a seventeenth adder, electrically connected to the ninth multiplier and the first integrator, receiving and adding the negative summing signal and the first positive DC level voltage to generate a seventeenth summing signal;

a thirteenth latch, electrically connected to the seventeenth adder, receiving and comparing the second clock signal and the seventeenth summing signal to generate a thirteenth digital value;

an eighteenth adder, electrically connected to the ninth multiplier and the sixth multiplier, receiving and adding the negative summing signal and the first negative DC level voltage to generate an eighteenth summing signal;

a fourteenth latch, electrically connected to the eighteenth adder, receiving and comparing the second clock signal and the eighteenth summing signal to generate a fourteenth digital value;

a fourth multiplexer, electrically connected to the thirteenth latch, the fourteenth latch, and the first latch corresponding to the first summing signal, receiving the thirteenth digital value, the fourteenth digital value, and the first digital value corresponding to the first summing signal, thereby outputting a fourth output value, the fourth multiplexer selects the thirteenth digital value as the fourth output value when the first digital value corresponding to the first summing signal is 1, and the fourth multiplexer selects the fourteenth digital value as the fourth output value when the first digital value corresponding to the first summing signal is 0;

a nineteenth adder, electrically connected to the ninth multiplier and the second integrator, receiving and adding the negative summing signal and the second positive DC level voltage to generate a nineteenth summing signal;

a fifteenth latch, electrically connected to the nineteenth adder, receiving and comparing the second clock signal and the nineteenth summing signal to generate a fifteenth digital value;

a twentieth adder, electrically connected to the ninth multiplier and the seventh multiplier, receiving and adding the negative summing signal and the second negative DC level voltage to generate a twentieth summing signal;

a sixteenth latch, electrically connected to the twentieth adder, receiving and comparing the second clock signal and the twentieth summing signal to generate a sixteenth digital value;

a fifth multiplexer, electrically connected to the fifteenth latch, the sixteenth latch, and the first latch corresponding to the first summing signal, receiving the fifteenth digital value, the sixteenth digital value, and the first digital value corresponding to the first summing signal, thereby outputting a fifth output value, the fifth multiplexer selects the fifteenth digital value as the fifth output value when the first digital value corresponding to the first summing signal is 1, and the fifth multiplexer selects the sixteenth digital value as the fifth output value when the first digital value corresponding to the first summing signal is 0;

a sixth multiplexer, electrically connected to the fourth multiplexer, the fifth multiplexer, and the second pattern filter, receiving either of the third value or the fourth value, the fourth output value, and the fifth output value, thereby outputting a sixth output value, the sixth multiplexer selects the fourth value as the sixth output value when the second pattern filter outputs the third value, and the sixth multiplexer selects the fifth value as the sixth output value when the second pattern filter outputs the fourth value;

a tenth multiplier, electrically connected to the sixth multiplexer and the fifth latch corresponding to the fifth summing signal, receiving the sixth output value and the fifth digital value corresponding to the sixth summing signal, and multiplying the sixth output value by the fifth digital value corresponding to the sixth summing signal to generate a first compensation signal;

a fourth integrator, electrically connected to the tenth multiplier, the first multiplier, and the fourth multiplier, receiving the first compensation signal and integrating it to generate the first compensation coefficient;

an eleventh multiplier, electrically connected to the sixth multiplexer and the third latch corresponding to the first summing signal, receiving the sixth output value and the third digital value corresponding to the first summing signal and multiplying the sixth output value by the third digital value corresponding to the first summing signal to generate a second compensation signal; and a fifth integrator, electrically connected to the eleventh multiplier, the second multiplier, and the third multiplier, receiving the second compensation signal and integrating it to generate the second compensation coefficient.

7. The multi-level pulse-amplitude modulation receiver system according to claim 6, wherein the automatic gain controller further comprises:

a twenty-first adder, electrically connected to the sixth multiplier, the seventh multiplier, or the eighth multiplier, receiving and adding the expected voltage and one of the first negative DC level voltage, the second negative DC level voltage, and the at least one negative threshold voltage to generate a gain voltage;

a seventeenth latch, electrically connected to the twenty-first adder, receiving and comparing the gain voltage and a third clock signal whose frequency is more than 10 times slower than a frequency of the first clock signal to generate a seventeenth digital value; and a sixth integrator, electrically connected to the seventeenth latch and the analog equalizer, receiving and integrating the seventeenth digital value to generate the gain signal.

8. The multi-level pulse-amplitude modulation receiver system according to claim 3, wherein the at least two positive DC level voltages comprise a first positive DC level voltage and a second positive DC level voltage, the at least two negative DC level voltages comprise a first negative DC level voltage and a second negative DC level voltage, absolute values of the first positive DC level voltage and the second positive DC level voltage are respectively equal to absolute values of the first negative DC level voltage and the second negative DC level voltage, and the automatic level tracking engine further comprises:

a fifth multiplier, electrically connected to the first adder, receiving the first summing signal and multiplying it by negative one to generate a negative summing signal;

a first pattern filter, electrically connected to the at least three first latches, receiving the at least three first digital values, the first pattern filter uniformly divides all the binary codes into a first group and a second group, the binary codes of the first group are greater than the binary codes of the second group, the first pattern filter sequentially pairs the binary codes of the first group from high to low with the binary codes of the second group from low to high, uses two paired the binary codes to correspond to a first value or a second value, and outputs the first value or the second value;

an eleventh adder, electrically connected to the fifth multiplier, receiving and adding the negative summing signal and the first positive DC level voltage to generate an eleventh summing signal;

a seventh latch, electrically connected to the eleventh adder, receiving and comparing the second clock signal and the eleventh summing signal to generate a seventh digital value;

a first inverter, electrically connected to the seventh latch, receiving and inverting the seventh digital value to generate a first inverted digital value;

a twelfth adder, electrically connected to the fifth multiplier, receiving and adding the negative summing signal and the first negative DC level voltage to generate a twelfth summing signal;

an eighth latch, electrically connected to the twelfth adder, receiving and comparing the second clock signal and the twelfth summing signal to generate an eighth digital value;

a first multiplexer, electrically connected to the first inverter, the eighth latch, and the first latch corresponding to the first summing signal, receiving the first inverted digital value, the eighth digital value, and the first digital value corresponding to the first summing signal, thereby outputting a first output value, the first multiplexer selects the first inverted digital value as the first output value when the first digital value corresponding to the first summing signal is 1, and the first multiplexer selects the eighth digital value as the first output value when the first digital value corresponding to the first summing signal is 0;

a first signal selector, electrically connecting the first multiplexer and the first pattern filter, receiving the first value and the first output value, when the first pattern filter outputs the first value, the first signal selector outputs the first output value, and when the first pattern filter outputs the second value, the first signal selector outputs 0;

a first integrator, electrically connected to the first signal selector and the eleventh adder, receiving and integrating the first output value to generate the first positive DC level voltage;

a sixth multiplier, electrically connected to the first integrator and the twelfth adder, receiving the first positive DC level voltage and multiplying it by negative one to generate the first negative DC level voltage;

a thirteenth adder, electrically connected to the fifth multiplier, receiving and adding the negative summing signal and the second positive DC level voltage to generate a thirteenth summing signal;

a ninth latch, electrically connected to the thirteenth adder, receiving and comparing the second clock signal and the thirteenth summing signal to generate a ninth digital value;

a second inverter, electrically connected to the ninth latch, receiving and inverting the ninth digital value to generate a second inverted digital value;

a fourteenth adder, electrically connected to the fifth multiplier, receiving and adding the negative summing signal and the second negative DC level voltage to generate a fourteenth summing signal;

an tenth latch, electrically connected to the fourteenth adder, receiving and comparing the second clock signal and the fourteenth summing signal to generate an tenth digital value;

a second multiplexer, electrically connected to the second inverter, the tenth latch, and the first latch corresponding to the first summing signal, receiving the second inverted digital value, the tenth digital value, and the first digital value corresponding to the first summing signal, thereby outputting a second output value, the second multiplexer selects the second inverted digital value as the second output value when the first digital value corresponding to the first summing signal is 1, and the second multiplexer selects the tenth digital value as the second output value when the first digital value corresponding to the first summing signal is 0;

a second signal selector, electrically connecting the second multiplexer and the first pattern filter, receiving the second value and the second output value, when the first pattern filter outputs the second value, the second signal selector outputs the second output value, and when the first pattern filter outputs the first value, the second signal selector outputs 0;

a second integrator, electrically connected to the second signal selector and the thirteenth adder, receiving and integrating the second output value to generate the second positive DC level voltage;

a seventh multiplier, electrically connected to the second integrator and the fourteenth adder, receiving the second positive DC level voltage and multiplying it by negative one to generate the second negative DC level voltage;

a fifteenth adder, electrically connected to the first integrator and the second integrator, receiving and adding the first positive DC level voltage and the second positive DC level voltage to generate a fifteenth summing signal;

a divider, electrically connected to the fifteenth adder, the at least one third adder, and the at least one seventh adder, receiving the fifteenth summing signal and dividing it by two to generate the at least one positive threshold voltage; and an eighth multiplier, electrically connected to the divider, the at least one second adder, and the at least one eighth adder, receiving the at least one positive threshold voltage and multiplying it by negative one to generate the at least one negative threshold voltage.

9. The multi-level pulse-amplitude modulation receiver system according to claim 1, wherein the analog equalizer is a continuous time linear equalizer (CTLE).

* * * * *